United States Patent
Ofek et al.

(10) Patent No.: US 6,885,664 B2
(45) Date of Patent: Apr. 26, 2005

(54) DISTRIBUTED SWITCHING SYSTEM AND METHOD WITH TIME-BASED ROUTING

(75) Inventors: Yoram Ofek, Riverdale, NY (US); Nachum Shacham, Palo Alto, CA (US)

(73) Assignee: Synchrodyne Networks, Inc., Riverdale, NY (US)

( * ) Notice: Subject to any disclaimer, the term of this patent is extended or adjusted under 35 U.S.C. 154(b) by 815 days.

(21) Appl. No.: 09/897,555

(22) Filed: Jul. 2, 2001

(65) Prior Publication Data

US 2001/0038628 A1 Nov. 8, 2001

Related U.S. Application Data

(62) Division of application No. 09/120,529, filed on Jul. 22, 1998.

(51) Int. Cl.$^7$ ............................................... H04L 12/50
(52) U.S. Cl. ....................................... 370/372; 370/375
(58) Field of Search ................................. 370/235, 299, 370/360, 372, 375, 376, 386, 389, 390, 413, 419, 428, 429, 442, 458

(56) References Cited

U.S. PATENT DOCUMENTS 5,251,209 A  * 10/1993 Jurkevich et al. ........... 370/468
5,455,701 A  * 10/1995 Eng et al. .................... 398/54
5,742,606 A  *  4/1998 Iliadis et al. ................. 370/413

* cited by examiner

Primary Examiner—Wellington Chin
Assistant Examiner—Brenda Pham
(74) Attorney, Agent, or Firm—Sitrick & Sitrick

(57) ABSTRACT

This invention describes a method for transmitting and forwarding packets over a switching network using time information. The network switches maintain a common time reference, which is obtained either from an external source (such as GPS—Global Positioning System) or is generated and distributed internally. The time intervals are arranged in simple periodicity and complex periodicity (like seconds and minutes of a clock). A data packet that arrives to an input port is switched to an output port based on its order or time position in the time interval in which it arrives at the switch. The time interval duration can be longer than the time duration required for transmitting a data packet, in which case the exact position of a data packet in its forwarding time interval is predetermined.

This invention provides congestion-free data packet switching for data packets for which capacity in their corresponding forwarding links and time intervals is reserved in advance. Furthermore, such data packets reach their destination, which can be one or more (i.e., multicast) in predefined time intervals, which guarantees that the delay jitter is smaller than or equal to one time interval.

34 Claims, 24 Drawing Sheets

4B/5B encoding scheme

| HEX DATA | 4-bit Binary Data | 5-bit Encoded Data Codeword |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

4B/5B encoding scheme

| HEX DATA | Control Input Binary Data | 10-bit Encoded Control Codeword |
|---|---|---|
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

Fig. 12

| OUTPUT PORT (35-1) | OUT-GOING TIME-FRAME (35-2) | POSITION IN OUT-GOING TIME-FRAME (35-3) |
|---|---|---|
| 5 | t+4 mod k | a |
| 1 | t+3 mod k | d |
| 4 | t+5 mod k | b |
| 3 | t+3 mod k | d |

Time-frame of Arrival (TOA) 35T, Position Counter 35P ↑ 35C

35D

- Real-time protocol (RTP) with the following fields in the header:
  - version (V) - 2 bits
  - padding (P) - 1 bit
  - extension (X) - 1 bit
  - CSRC count (CC) - 4 bits
  - marker (M) - 1 bit
  - payload type - 7 bits
  - sequence number - 16 bits
  - times-tamp - 32 bits

FIG. 15

| OUTPUT PORT | OUT-GOING TIME-FRAME | POSITION IN OUT-GOING TIME-FRAME |
|---|---|---|
| 5 | t+4 mod k | a |
| 1 | t+3 mod k | d |
| 4 | t+5 mod k | b |
| 3 | t+3 mod k | d |

35-1, 35-2, 35-3

35D

Position Counter 35P, Time Stamp 35TS, Virtual Pipe ID (PID) 35C

35C

DISTRIBUTED SWITCHING SYSTEM AND METHOD WITH TIME-BASED ROUTING

RELATED APPLICATIONS

This application is a divisional application filed, pursuant to 37 CFR §1.53(b), of copending, non-provisional patent application with Ser. No. 09/120,529, filed Jul. 22, 1998, which is incorporated herein by reference.

BACKGROUND OF THE INVENTION

This invention relates generally to a method and apparatus for transmitting of data on a communications network. More specifically, this invention provides timely forwarding and delivery of data over the network and to their destination nodes. Consequently, the end to-end performance parameters, such as, loss, delay and jitter, have either deterministic or probabilistic guarantees.

This invention facilitates the routing of data packets using only time information that is globally available from the global positioning system (GPS). Consequently, over this novel communications network it is possible to transport wide variety of data packets, such as, IP (Internet protocol) and ATM (asynchronous transfer mode). Furthermore, since routing decisions are done in the time domain and there is no need to decode the address in the packet header, it is feasible to encrypt the entire data packet (including the header) as it is transferred through a public backbone network, which is an important security feature.

The proliferation of high-speed communications links, fast processors, and affordable, multimedia-ready personal computers brings about the need for wide area networks that can carry real time data, like telephony and video. However, the end-to-end transport requirements of real-time multimedia applications present a major challenge that cannot be solved satisfactorily by current networking technologies. Such applications as video teleconferencing, and audio and video multicasting generate data at a wide range of bit rates and require predictable, stable performance and strict limits on loss rates, average delay, and delay variations ("jitter"). These characteristics and performance requirements are incompatible with the services that current circuit and packet switching networks can offer.

Circuit-switching networks, which are still the main carrier for real-time traffic, are designed for telephony service and cannot be easily enhanced to support multiple services or carry multimedia traffic. Its synchronous byte switching enables circuit-switching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the synchronous byte switching of SONET, which embodies the Synchronous Digital Hierarchy (SDH), requires increasingly more precise clock synchronization as the lines speed increases [Ballart et al., "SONET: Now It's The Standard Optical Network", IEEE Communications Magazine, Vol. 29 No. 3, March 1989, pages 8–15] [M. Schwartz, "Telecommunication Networks: Protocols, Modeling, and Analysis", Addison Wesley, Reading Mass., 1987].

Packet switching networks like IP (Internet Protocol)-based Internet and Intranets [see, for example, A. Tannebaum, "Computer Networks" (3rd Ed) Prentice Hall, 1996] and ATM (Asynchronous Transfer Mode) [see, for example, Handel et al., "ATM Networks: Concepts, Protocols, and Applications", (2nd Ed.) Addison-Wesley, 1994] handle bursty data more efficiently than circuit switching, due to their statistical multiplexing of the packet streams. However, current packet switches and routers operate asynchronously and provide best effort service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception. In fact, under best effort service, the performance characteristics of a given connection are not even predictable at the time of connection establishment.

Efforts to define advanced services for both IP and ATM have been conducted in two levels: (1) definition of service, and (2) specification of methods for providing different services to different packet streams. The former defines interfaces, data formats, and performance objectives. The latter specifies procedures for processing packets by hosts and switches/routers. The types of services that defined for ATM include constant bit rate (CBR), variable bit rate (VBR) and available bit rate (ABR). For IP, the defined services include guaranteed performance (bit rate, delay), controlled flow, and best effort [J. Wroclawski, "Specification of the Controlled-Load Network Element Service", IETF RFC 2211, September 1997] [Shenker et. al., "Specification of Guaranteed Quality of Service", IETF RFC 2212. September 1997]. Signaling protocols, e.g., RSVP and UNI3.1, which carry control information to facilitate the establishment of the desired services, are specified for IP and ATM, respectively [R. Braden, "Resource ReSerVation Protocol (RSVP)—Version 1 Functional Specification, IETF Request for Comment RFC2205", September 1997] [Handel et al., "ATM Networks: Concepts, Protocols, and Applications", (2nd Ed.) Addison-Wesley, 1994]. These protocols address the transport of data to one destination known as unicast or multiple destinations multicast [S. Deering, "Multicast Routing In Datagram Internet", Ph.D. Thesis, Stanford University, December 1991]. In addition, SIP, a higher level protocol for facilitating the establishment of sessions that use the underlying services, is currently under definition under IETF auspices [Handley et al., "SIP-Session Initiation Protocol", <draft-draft-ietf-mmusic-sip-04.ps>, November 1997].

The methods for providing different services under packet switching fall under the general title of Quality of Service (QoS). Prior art in QoS can be divided into two parts: (1) traffic shaping with local timing without deadline scheduling, for example [M. G. H. Katevenis, "Fast Switching And Fair Control Of Congested Flow In Broadband Networks", IEEE Journal on Selected Areas in Communications, SAC-5(8):1315–1326, October 1987; Demers et al., "Analysis and Simulation Of A Fair Queuing Algorithm", ACM Computer Communication Review (SIGCOMM'89), pages 3–12, 1989; S. J. Golestani, "Congestion-Free Communication In High-Speed Packet Networks", IEEE Transcripts on Communications, COM-39(12):1802–1812, December 1991; Parekh et al., "A Generalized Processor Sharing Approach To Flow Control The Multiple Node Case", IEEE/ACM T. on Networking, 2(2):137–150, 1994], and (2) traffic shaping with deadline scheduling, for example [Ferrari et al., "A Scheme For Real-Time Channel Establishment In Wide-Area Networks", IEEE Journal on Selected Areas in Communication, SAC 8(4):368–379, April 1990; Kandlur et al., "Real Time Communication In Multi-Hop Networks", IEEE Trans. on Parallel and Distributed Systems, Vol. 5, No.

10, pp. 1044–1056, 1994]. Both of these approaches rely on manipulation of local queues by each router with little coordination with other routers. The Weighted Fair Queuing (WFQ), which typifies these approaches, is based on cyclical servicing of the output port queues where the service level of a specific class of packets is determined by the amount of time its queue is served each cycle [Demers et al., "Analysis and Simulation Of A Fair Queuing Algorithm," ACM Computer Communication Review (SIGCOMM'89), pages 3–12, 1989]. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The recognition that the processing of packets by switches and routers constitutes a performance bottleneck resulted in the development of methods for enhancing performance by simplifying the processing of packets. Multi-protocol Label Switching (MPLS) converts the destination address in the packet header into a short tag, which defines the routing of the packet inside the network [Callon et al., "A Proposed Architecture For MPLS" <draft-ietf-mpls-arch-00.txt> INTERNET DRAFT, August 1997].

The real-time transport protocol (RTP) [H. Schultzrinne et. al, RTP: A Transport Protocol for Real-Time Applications, IETF Request for Comment RFC1889, January 1996] is a method for encapsulating time-sensitive data packets and attaching to the data time related information like time stamps and packet sequence number. RTP is currently the accepted method for transporting real-time streams over IP internetworks and packet audio/video telephony based on ITU-T H.323.

Synchronous methods are found mostly in circuit switching, as compared to packet switching that uses mostly asynchronous methods. However, some packet switching synchronous methods have been proposed. IsoEthernet or IEEE 802.9a [IEEE 802.9a Editor. Integrated service(s): IEEE 802.9a "Isochronous Services With CSMA/CD MAC Service", IEEE Draft, March 1995] combines CSMA/CD (IEEE 802.3), which is an asynchronous packet switching, with N-ISDN and H.320, which is circuit switching, over existing Ethernet infrastructure (10Base-T). This is a hybrid solution with two distinct switching methods: N-ISDN circuit switching and Ethernet packet switching. The two methods are separated in the time domain by time division multiplexing (TDM). The IsoEthernet TDM uses fixed allocation of bandwidth for the two methods—regardless of their utilization levels. This approach to resource partitioning results in undesirable side effect like under-utilization of the circuit switching part while the asynchronous packet switching is over loaded but cannot use the idle resources in the circuit switching part.

One approach to an optical network that uses synchronization was introduced in the synchronous optical hypergraph [Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS-R-87–1343, May 1987], which also relates to how to integrate packet telephony using synchronization [Y. Ofek, "Integration Of Voice Communication On A Synchronous Optical Hypergraph", INFOCOM'88, 1988]. In the synchronous optical hypergraph, the forwarding is performed over hyperedges, which are passive optical stars. In [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] the synchronous optical hypergraph idea was applied to networks with an arbitrary topology and with point-to-point links. The two papers [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine [Patterson et al., "Computer Architecture: A Quantitative Approach", Morgan Kaufman Publishers, San Francisco, 1990]. In U.S. Pat. No. 5,455,701, Eng et al. discloses an apparatus for controlling a high-speed optical switching system with pipeline controller for switch control. In U.S. Pat. No. 5,418,779 Yemini et al. disclose a switched network architecture with common time reference. The time reference is used in order to determine the time in which multiplicity of nodes can transmit simultaneously over one predefined routing tree to one destination. At every time instance the multiplicity of nodes are transmitting to different single destination node.

SUMMARY OF THE INVENTION

This invention provides a method for transmitting and forwarding packets over a switching network using time information. The network switches maintain a common time reference, which is obtained either from an external source (such as GPS—Global Positioning System) or is generated and distributed internally. The time intervals are arranged in simple periodicity and complex periodicity (like seconds and minutes of a clock). A data packet that arrives to an input port is switched to an output port based on its order or time position in the time interval in which it arrives at the switch. The time interval duration can be longer than the time duration required for transmitting a data packet, in which case the exact position of a data packet in its forwarding time interval is predetermined.

This invention provides congestion-free data packet switching for data packets for which capacity in their corresponding forwarding links and time intervals is reserved in advance. Furthermore, such data packets reach their destination, which can be one or more (i.e., multicast) in predefined time intervals, which guarantees that the delay jitter is smaller than or equal to one time interval.

The method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections. On the Internet the non-reserved data packet traffic is called "best effort" traffic. In accordance with the present invention, the bandwidth allocated to a connection and the delay and jitter inside the network are independent. The packet timestamp that is carried in the RTP [H. Schultzrinne et. al, RTP: A Transport Protocol for RealTime Applications, IETF Request for Comment RFC1889, January 1996] header can be used in accordance with the present invention to facilitate time-based transport.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System—see, for example: http://www.utexas.edu/depts/grg/gcraft/notes/gps/gps.html). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http:\\www.boulder.nist.gov/timefreq) is responsible for coordinating with the International Bureau of Weights and Measures (BIPM) in Paris in maintaining UTC.

UTC timing is readily available to individual PCs through GPS cards For example, TrueTime, Inc.'s (Santa Rosa, Calif.) PCI-SG provides precise time, with zero latency, to computers that have PCI extension slots. Another way by which UTC can be provided over a network is by using the Network Time Protocol (NTP) [D. Mills, "Network Time Protocol" (version 3) IETF RFC 1305]. However, the clock accuracy of NTP is not adequate for interswitch coordination, on which this invention is based. In accordance with the present invention, the use of reserved resources is allowed by all packet traffic whenever the reserved resources are not in use.

Although the present invention relies on time to control the flow of packets inside the network in a similar fashion as in circuit switching, there are major differences between the two approaches. In circuit switching, for each data unit (e.g., a byte) at the time it has been transmitted from its source, it is possible to predict deterministically the future times it will be transmitted from any switch along its route [Ballart et al., "SONET: Now It's The Standard Optical Network", IEEE Communications Magazine, Vol. 29 No. 3, March 1989, pages 8–15]. The time resolution of this advanced knowledge is much shorter than the data unit transmission time. On the other hand, in accordance with the present invention, for each data unit (e.g., a cell) at the time it has been transmitted from its source, it is possible to know the future time frames that this data unit will be forwarded along its route. However, the time frame, which constitutes the accuracy of this advance timing knowledge, is much larger than one data unit transmission time. For example, the transmission time of an ATM cell (53 bytes) over a gigabit per second link is 424 nanoseconds, which is 294 times smaller than a typical time frame of 125 microsecond—used in one embodiment of the present invention. There are several consequences that further distinguish the present invention from circuit switching:

In accordance with the present invention, the synchronization requirements are independent of the physical link transmission speed, while in circuit switching the synchronization becomes more and more difficult as the link speed increases.

In accordance with the present invention, timing information is not used for routing, and therefore, in the Internet, for example, the routing is done using IP addresses or a tag/label.

In accordance with the present invention, the Internet "best effort" packet forwarding strategy can be integrated into the system.

These and other aspects and attributes of the present invention will be discussed with reference to the following drawings and accompanying specification.

Routing—the selection of an output port for an information segment (i.e. data packets) that arrives at an input port of a switch—is a fundamental function of communication networks. In circuit switching networks, the unit of switching is a byte, and the switching is made based on the location of the byte in a time frame. Establishing a connection in a circuit switching network requires the network to reserve a slot for the connection in every frame. The position of the byte in the frame is different from link to link, so each switch maintains a translation table from incoming frame positions on each input port to respective output ports and frame positions therein. The sequence of frame positions on the links of the route constitute a circuit that is assigned for the exclusive use of a specific connection, which results in significant inflexibility: the connection is limited in traffic intensity by the capacity of the circuit and when the connection does not use the circuit no other is allowed to use it. This feature is useful for CBR traffic, like PCM telephony, but it results in low utilization of the network when the traffic is bursty [C. Huitema, Routing in the Internet, Prentice Hall, 1995, and A. Tannebaum Computer Networks (3rd Ed) Prentice Hall 1996].

In packet switching networks the unit of switching is a packet, which carries a bit pattern that provides the switch/router with sufficient information to route the packet all the way to its destination. In IP networks, the packet carries the destination's IP address, which is compared at each switch that the packet visits to the entries in a routing table local to the switch, and is routed accordingly [A. Tannebaum Computer Networks (3rd Ed) Prentice Hall 1996]. The recognition that the processing of packet by switches and routers constitutes a performance bottleneck resulted in the development of methods for enhancing performance by simplifying the processing of packets. Multi-protocol Label Switching (MPLS) converts the destination address in the packet header into a short tag, which defines the routing of the packet inside the network [R. Callon et al., A proposed architecture for MPLS <draft-ietf-mpls-arch-00.txt>INTERNET DRAFT, August 1997]. MPLS can be used by this invention to identify virtual pipes. ATM networks rely on virtual connection identifier (VCI), which is a short bit sequence that each cell carries and which determines the routing in a single switch. A cell is carried over a complete route through a sequence of VCI translations, from input VCI to output VCI, which is done by every switch on the route [R. Handel et al. ATM Networks: Concepts, Protocols, and Applications (2nd Ed.). Addison-Wesley, 1994].

The routing method that is disclosed in this invention is designed to operate with virtual pipe forwarding that carry real-time traffic over packet switching networks while guaranteeing end-to-end performance. This approach combines the advantages of both circuit and packet switching. It provides for allocation for the exclusive use of predefined connections and for those connections it guarantees loss free transport with low delay and jitter. When predefined connections do not use their allocated resources, other packets can use them without affecting the performance of the predefined connections.

In this invention the synchronization requirements are independent of the physical link transmission speed, while in circuit switching the synchronization becomes more and more difficult as the link speed increases.

In this invention timing information is not used for routing, and therefore, in the Internet, for example, the routing is done using IP addresses or a tag/label.

In this invention "best effort" strategy can be integrated into the system.

These and other aspects and attributes of the present invention will be discussed with reference to the following drawings and accompanying specification.

BRIEF DESCRIPTION OF THE DRAWINGS

FIG. 8 is a table of the 4B/5B encoding scheme for data—used by the AM7968—TAXI chip set;

FIG. 9 is a table of the 4B/5B encoding scheme for control signals, such as, the time frame delimiter (TFD)—used by the AM7968;

FIG. 12 is an example of a routing and scheduling table on one of the incoming input ports using the incoming time or time-frame of arrival (ToA) and the position counter value for determining: (i) the output port, (ii) the out-going time-frame, and (iii) the position of the outgoing data packet within the out-going time-frame;

FIG. 15 is an example of a routing and scheduling table on one of the incoming input ports using the time stamp and position information for determining: (i) the output port, (ii) the out-going time-frame, and (iii) the position of the out-going data packet within the out-going time-frame;

DETAILED DESCRIPTION OF THE PREFERRED EMBODIMENT

Figure 1:
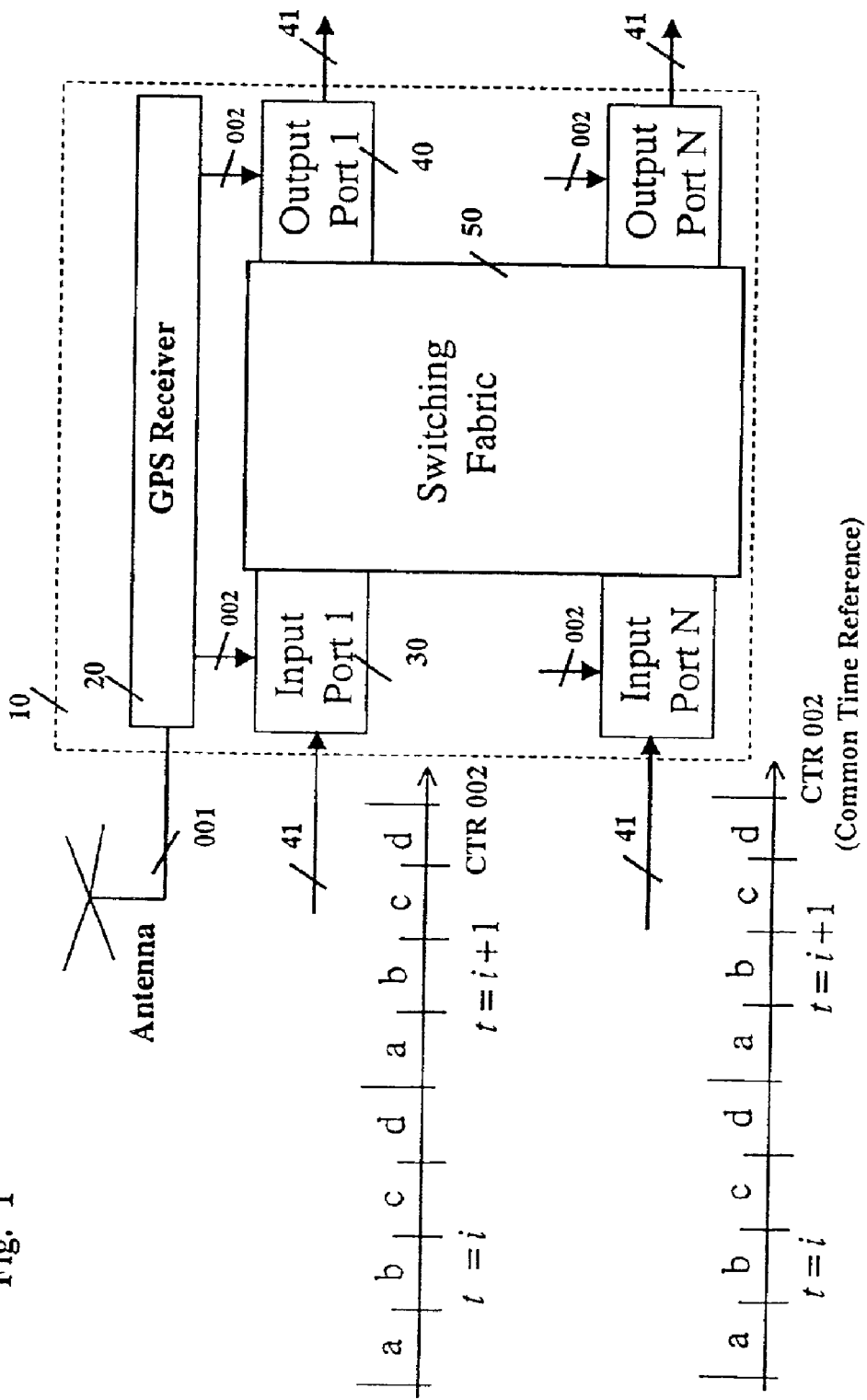
FIG. 1 is a schematic description of a switch with a common time reference partition into time-frames with predefined positions such that the input port can unambiguously identify the positions.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for transmitting and forwarding packets over a packet switching network. The switches of the network maintain a common time reference, which is obtained either from an external source (such as GPS—Global Positioning System) or is generated and distributed internally. The time intervals are arranged in simple periodicity and complex periodicity (like seconds and minutes of a clock). A packet that arrives to an input port of a switch, is switched to an output port based on (i) its position within the predefined time interval and (ii) the unique address of the incoming input port. Each switch along a route from a source to a destination forwards packets in periodic time intervals that are predefined using the common time reference. The time interval duration can be longer than the time duration required for transmitting a packet.

The system is designed for transferring data packets across a data network while using only time information and position information within predefined time intervals or time frames for routing, and maintaining for reserved data traffic constant bounded jitter (or delay uncertainty) and no congestion-induced loss of data packets. Such properties are essential for many multimedia applications, such as, telephony and video teleconferencing.

FIG. 1 depicts a schematic description of a switch 10. The switch 10 is constructed of four components: plurality of uniquely addressable input ports 30, in FIG. 1 there is N such ports, plurality of uniquely addressable output ports 40, in FIG. 1 there is N such ports, switching fabric 50, and global positioning system (GPS) time receiver 20 with a GPS antenna 001. The GPS time receiver provides a common time reference (CTR) 002 to all input and output ports. The common time reference is partitioned into time frames. Each of the time frames is further comprised of predefined positions such that the input port can unambiguously identify the positions. The time and position that a data packet arrives into the input port are used by the time-based routing controller 35 for determining the output port that incoming data packet should be switched to, as it will be described in the detailed description of the input port.

In FIG. 1, each of the time frames, t=i and t=i+1, has four predefined positions: a, b, c and d. In each of the positions one data packet can be stored. The positions can be marked explicitly with position delimiters (PDs) between the variable size data packets, as it will be explained below, or implicitly. Implicit position within a time frame can be achieved by either measuring time delays—this is suitable for sending a fixed size ATM (asynchronous transfer mode) cells, or by placing data packets of variable size in the predefined positions within each of the time frames—if the output port 40 does not have a data packet to transmit in a predefine position an empty or null data packet should be sent.

Figure 2:
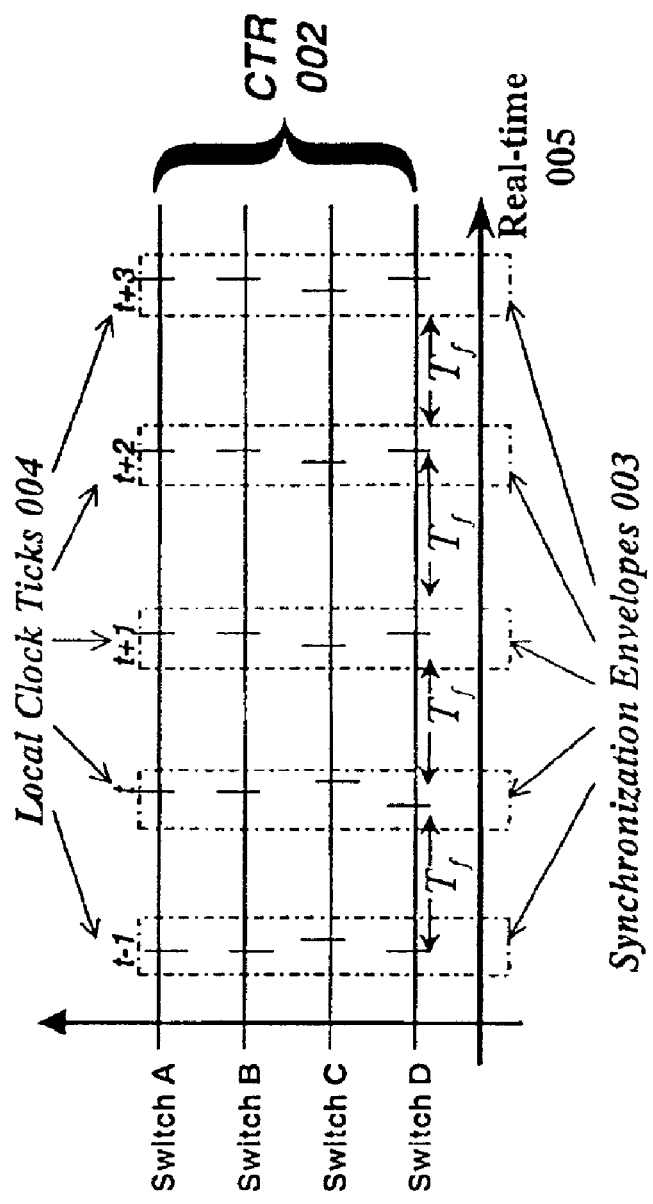
FIG. 2 is a diagram of how time is divided into time frames of a predefined duration, and the relationship among the local common time reference (CTR) on the switches, and how the multiplicity of local times is projected on the real-time axis.
Figure 4:
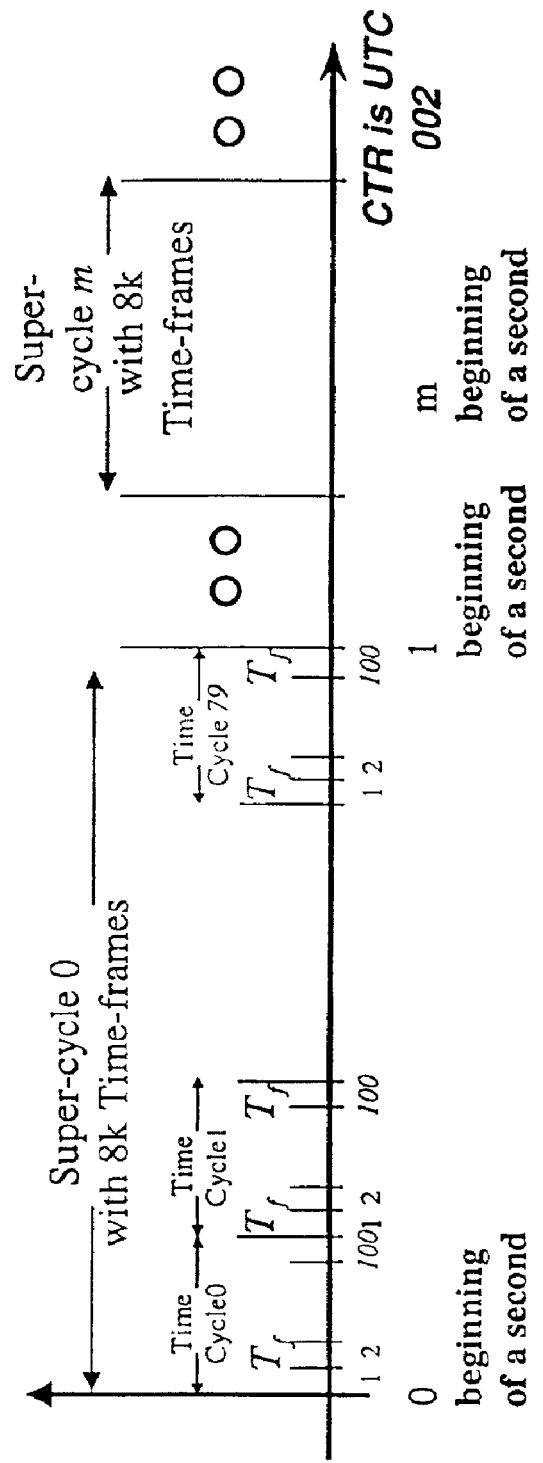
FIG. 4 is a schematic illustration of the relationship of the network common time reference and UTC (Coordinated Universal Time), such that, each time-cycle has 100 time frames, of 125 μsec each, and 80 time-cycles are grouped into one super-cycle of one second.

The Common Time Reference (CTR) 002:

As shown in FIG. 2, the common time reference 002 that is coupled to the switches 10 provides the following property: the local clock ticks 004, shown in FIG. 4, at all the pipeline switches (e.g., switches A, B, C, and D in FIGS. 21 and 22) when projected on the real-time axis 005 will all occur within predefined synchronization envelopes 003. In other words, the local clock ticks 004 occur within the synchronization envelopes 003, and therefore, outside to the synchronization envelopes all local clocks have the same clock value.

The common time reference is divided in a predefined manner into time frames, Tf, of equal duration, as shown in FIG. 2, typically Tf=125 microseconds. The time frames are grouped into time cycles. Each time cycle has predefined number of time frames.

Figure 3:
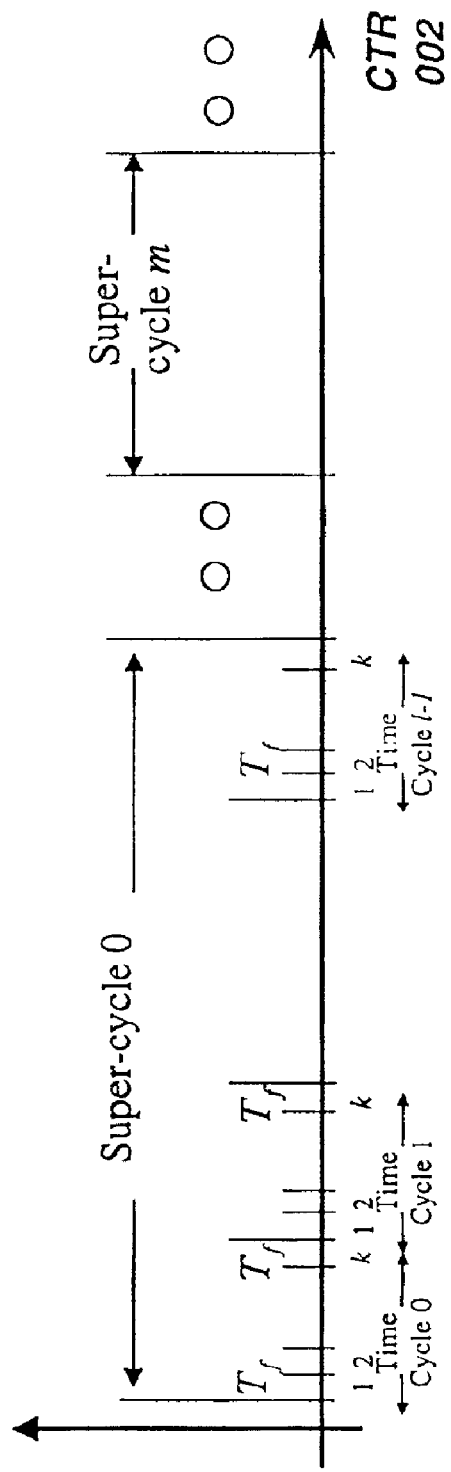
FIG. 3 is a schematic illustration of how the common time reference is organized into contiguous time-cycles of k time-frames each and contiguous super-cycle of 1 time cycles each.
Figure 6:
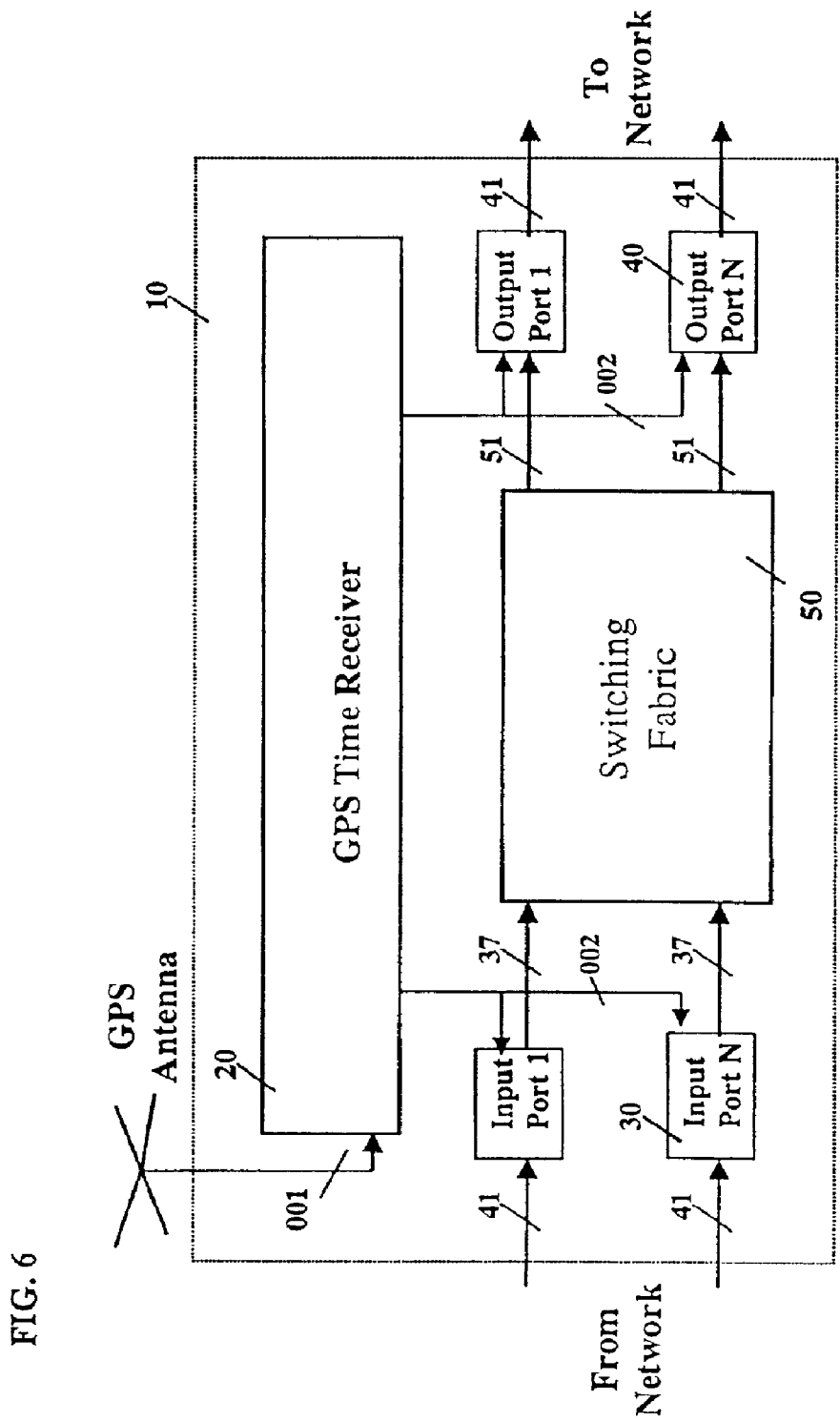
FIG. 6 is a schematic illustration of a virtual pipe and its timing relationship with a common time reference (CTR). Delay is determined by the number of time frames between the forward time out at Node A and the forward time out at Node D.

Referring to FIG. 3, there are k time frames in each time cycle. Contiguous time cycles are grouped together into contiguous super cycles, and as shown in FIG. 6, there are 1 time cycles in each super cycle.

FIG. 4 illustrates how the common time reference can be aligned with the UTC (Coordinated Universal Time) standard. In this illustrated example, every duration of every super cycle is exactly one second as measured by UTC. Moreover, the beginning of each super cycle coincides with the beginning of a UTC second, as shown in FIG. 4. Consequently, when leap seconds are inserted or deleted for UTC corrections (due to changes in the earth rotation period) the cycle and super cycle periodic scheduling will not be affected.

Figure 21:
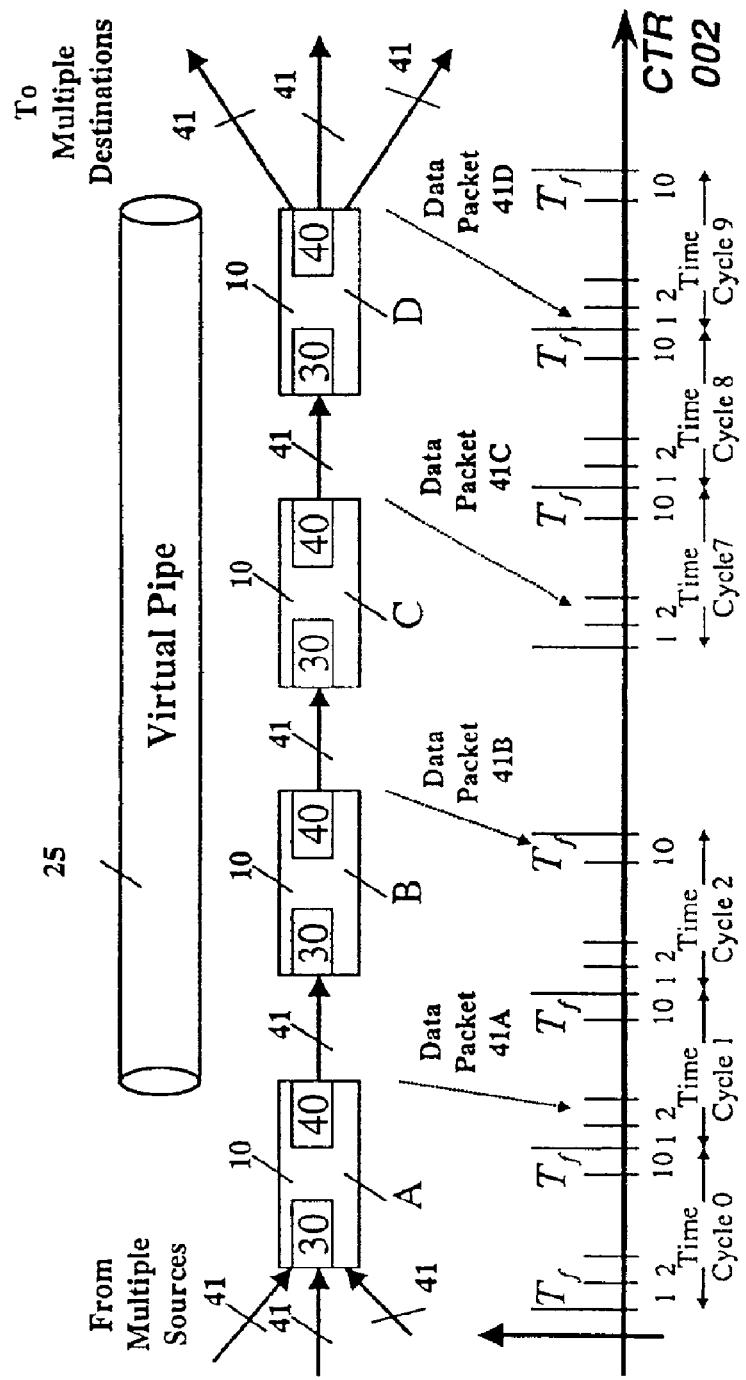
FIG. 21 is a schematic illustration of a virtual pipe and its timing relationship with a common time reference (CTR). Delay is determined by the number of time frames between the forward time out at Node A and the forward time out at Node D.
Figure 22:
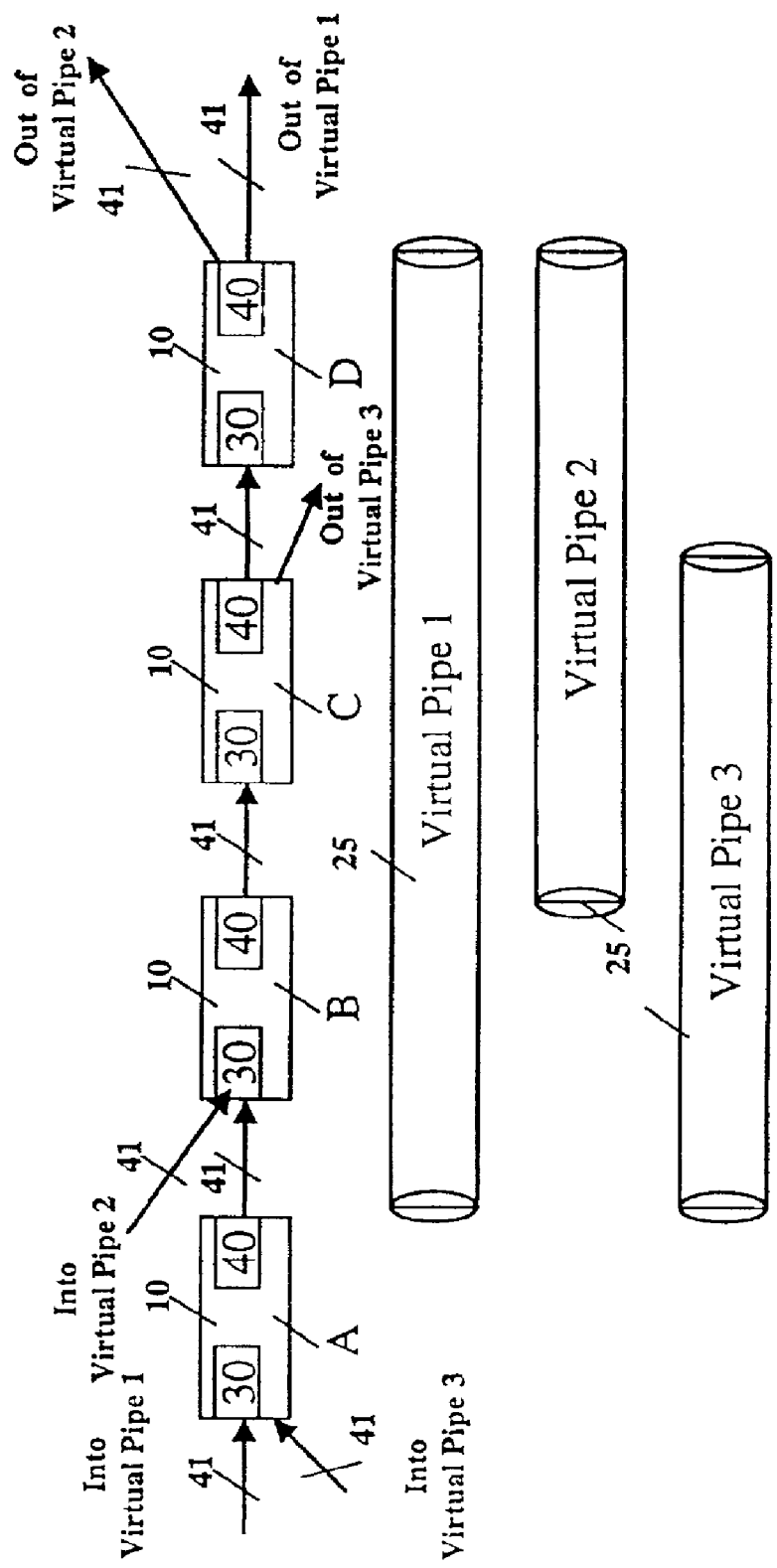
FIG. 22 is a schematic illustration of multiple virtual pipes.

The time frames, time cycles, and super cycles are associated in the same manner with all respective switches within the virtual pipe, FIG. 21 and FIG. 22 at all times.

Figure 5:
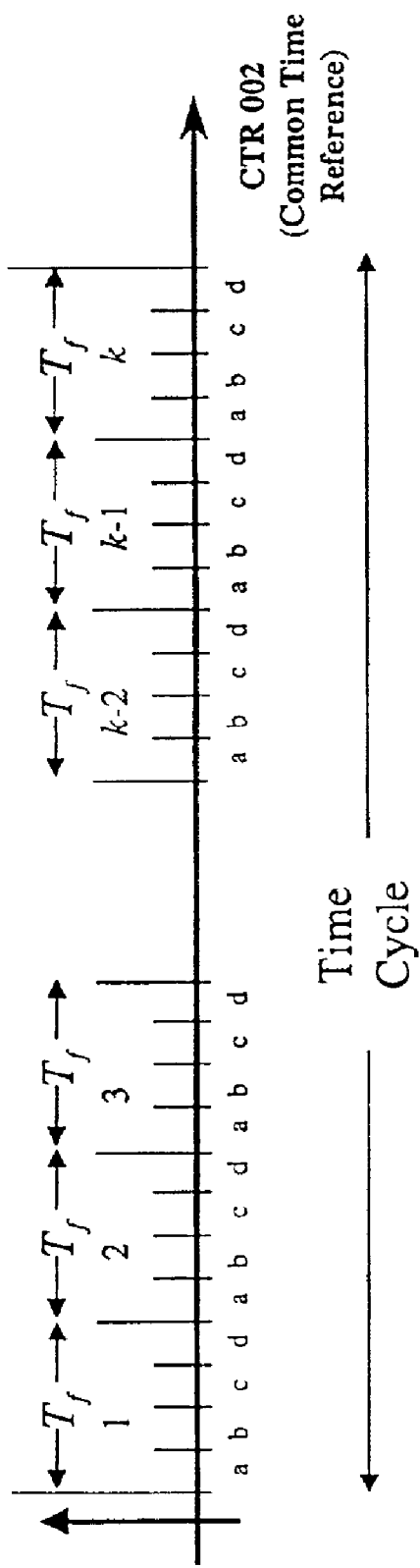
FIG. 5 is a description of the timing partition of the common time reference into cycle with k time frames in each, while each time frame is further partitioned into four predefined parts: a, b, c and d.

FIG. 5 depicts a common time reference (CTR) 002 axis that is divided into time cycles. Each time cycle is divided into predefined frames. Each of the time frame has predefined positions: a, b, c, and d of either fixed size (in time duration) or variable size (in time duration), consequently, the predefined position can have ether fixed size data packets or variable size data packets, respectively.

Figure 7:
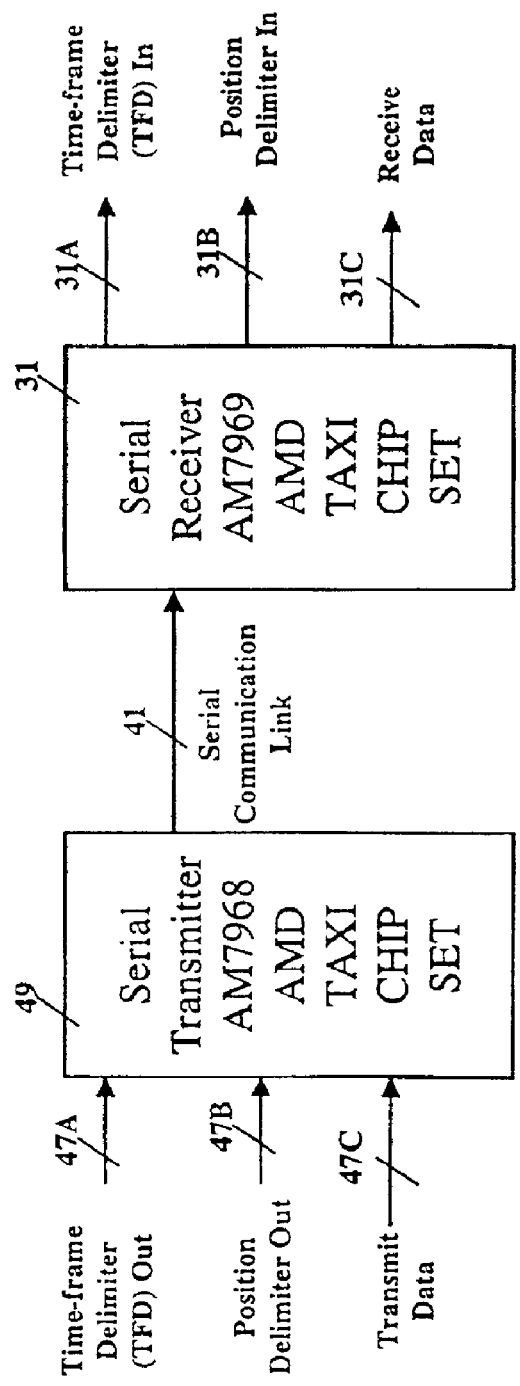
FIG. 7 is an illustration of a serial transmitter and a serial receiver.

A Switch 10:

In the following, a switch 10 structure, shown in FIG. 6, is overviewed then in the following subsections the various parts are described in detail. Each switch 10 is comprised of a plurality of addressable input ports 30 and output ports 40. The input port further comprised of a time-based routing controller 35, shown in FIG. 10, for mapping each of the data packets that arrives at each one of the input ports to a respective one of the output ports. The output port further comprised of a scheduling controller and transmit buffer 45. An output port is connected to an input port via a communication link 41, as shown in FIG. 7. The communication link can be realized using various technologies without affecting this invention.

The common time reference 002, shown in FIG. 6, is provided to the input ports 30 and output ports 40 from the GPS time receiver 20, which receives its timing signal from the GPS antenna 001. GPS time receivers are available from variety of manufacturers, such as, TrueTime, Inc. With such equipment it is possible to maintain a local clock with accuracy of ±1 microsecond from the UTC (Coordinated Universal Time) standard every where around the globe.

The Communication Link and Time Frame Delimiter Encoding:

The communication links 41 used for the system disclosed is in this invention can be of various types: fiber optic, wireless, etc. The wireless links can be between at least one of a ground station and a satellite, between two satellites orbiting the earth, or between two ground stations, as examples.

Referring to FIG. 7, a serial transmitter 49 and serial receiver 31 are illustrated as coupled to each link 41. A variety of encoding schemes can be used for a serial line link 41 in the context of this invention, such as, SONETISDH, 8B/10B Fiber Channel, 4B/5B FDDI. In addition to the encoding and decoding of the data transmitted over the serial link, the serial transmitter/receiver (49/31) sends/receives control words for a variety of control purposes, mostly unrelated to the present invention description. However, one control word, time frame delimiter (TFD), is used in accordance with the present invention. The TFD marks the boundary between two successive time frames and is sent by a serial transmitter 49 when a CTR 002 clock tick occurs in a way that is described hereafter as part of the output port operation. It is necessary to distinguish in an unambiguous manner between the data words, which carry the information, and the control signal or words (e.g., the TFD is a control signal) over the serial link 41. There are many ways to do this. One way is to use the known 4B/5B encoding scheme (used FDDI). In this scheme, every 8-bit character is divided into two 4-bit parts and then each part is encoded into a 5-bit codeword that is transmitted over the serial link 41.

FIG. 8 illustrates an encoding table from 4-bit data to 5-bit serial codewords. The 4B/5B is a redundant encoding scheme, which means that there are more codewords than data words. Consequently, some of the unused or redundant serial codewords can be used to convey control information.

FIG. 9 is a table with 15 possible encoded control codewords, which can be used for transferring the time frame delimiter (TFD) over the serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codewords, since SONET/SDH serial encoding is based on scrambling with no redundancy. Consequently, the TFD is implemented using the SONET/SDH frame control fields: transport overhead (TOH) and path overhead (POH).

Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

Figure 10:
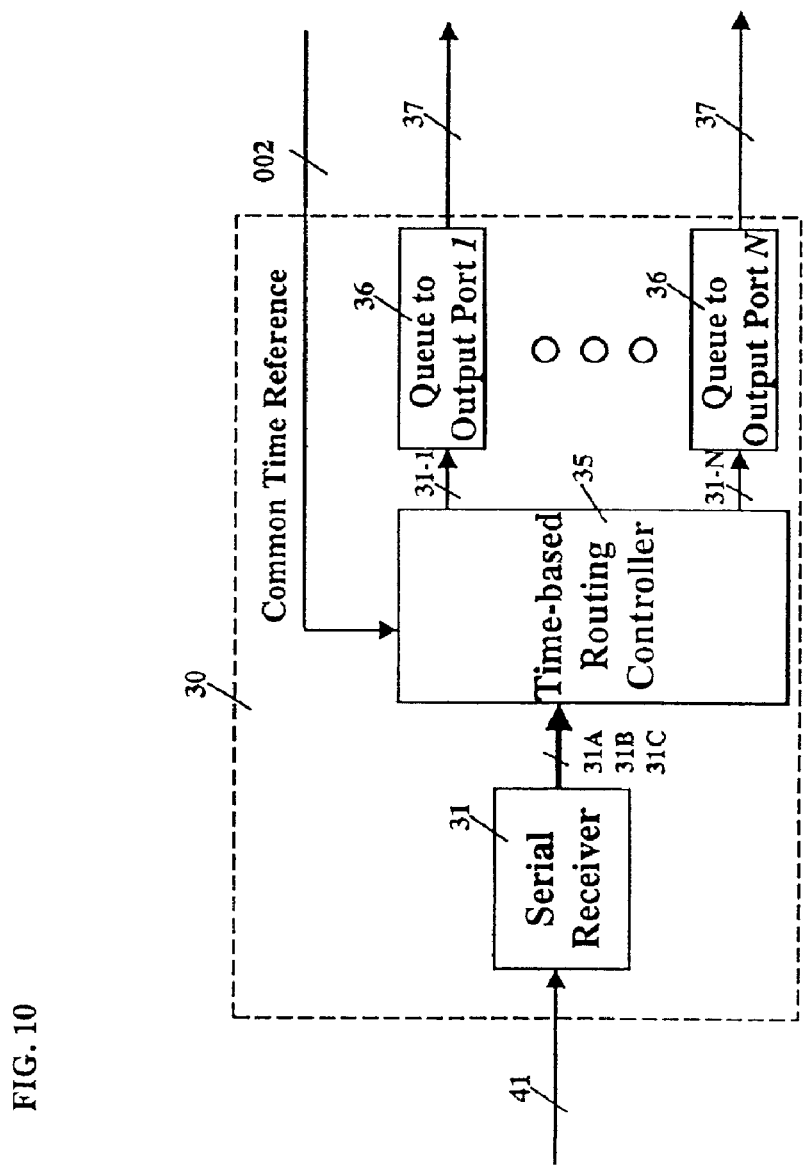
FIG. 10 is a schematic illustration of an input port with a routing controller.

The Input Port:

The input port 30, shown in FIG. 10, has three parts: serial receiver 31, time-based routing controller 35 and separate queues 36 to the plurality of output ports 40. The serial receiver 31 transfers to the time-based routing controller 35 data packets, time frame delimiters (TFD) and position delimiters (PD).

Figure 11:
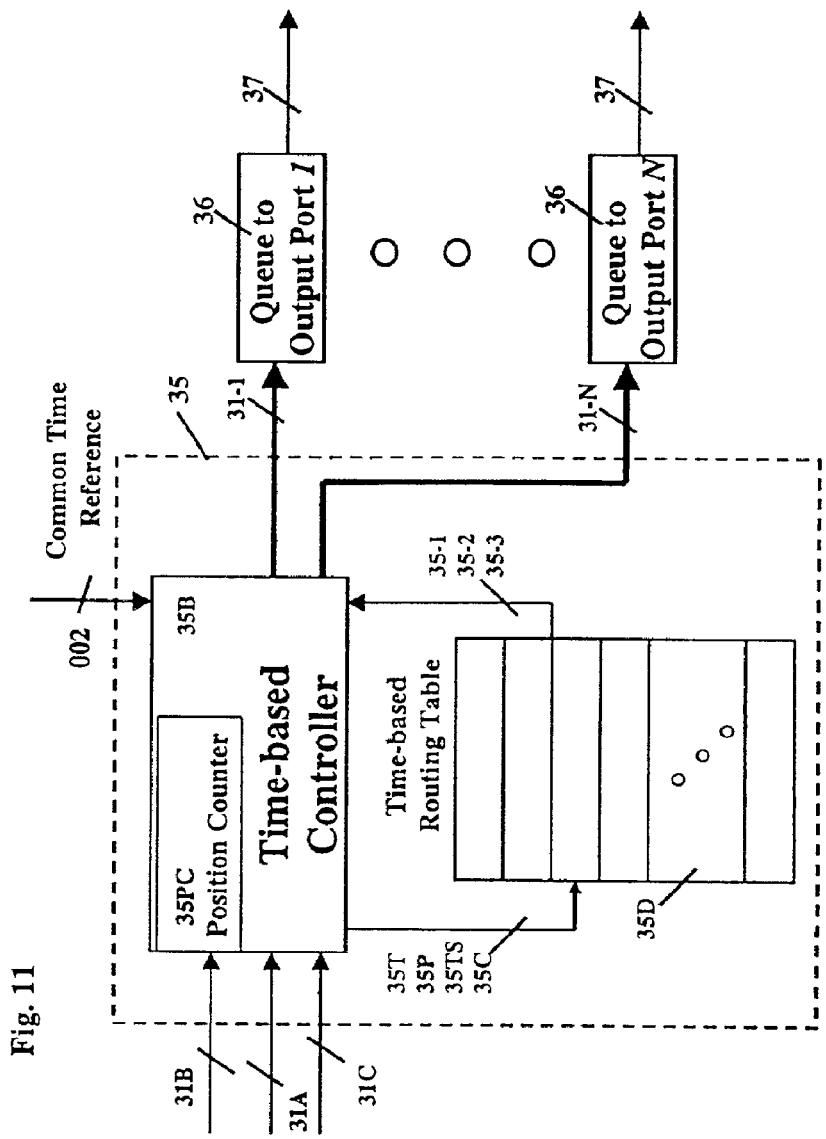
FIG. 11 is a schematic diagram of the time-based routing controller. This unit determines to which output port a data packet should be switched and attaches the time in and position information to the data packet header.

The routing controller is constructed of a central processing unit (CPU), a random access memory (RAM) for storing the data packets, read only memory (ROM) for storing the time-based routing controller processing program, and a time-based routing table is used for determining the following parameters (see 35D in FIGS. 11, 12 and 15):

1. Parameter 35-1 in table 35D (FIGS. 12, 15)—the output port 40 that the incoming data packet should be switched to—this parameter is used for switching the data packet to the queue 36 that is leading to the corresponding output port;
2. Parameter 35-2 in table 35D (FIGS. 12, 15)—the out-going time frame in which the data packet will be forwarded out of the output port—this parameter is attached to the data packet header in FIG. 13, and
3. Parameter 35-3 in table 35D (FIGS. 12, 15)—the position within the out going time frame in which the data packet will be forwarded out of the output port—this parameter is attached to the data packet header in FIG. 13.

The time-based routing controller 35B determines the entry to the time-based routing table 35D, in FIGS. 12 and 15, in various ways, such as:

Local time and position by using (1) the time-frame of arrival (TOA) 35T—the time frame using the common time reference 002, and (2) the position value 35P within that time frame as measured by the position counter 35PC. This is depicted in FIG. 12.

Time stamp 35TS and position 35PC by using (1) the time stamp 35TS in the data packet header in FIG. 13B, and (2) the position value 35P within that time frame as measured by the position counter 35PC.

Figure 13:
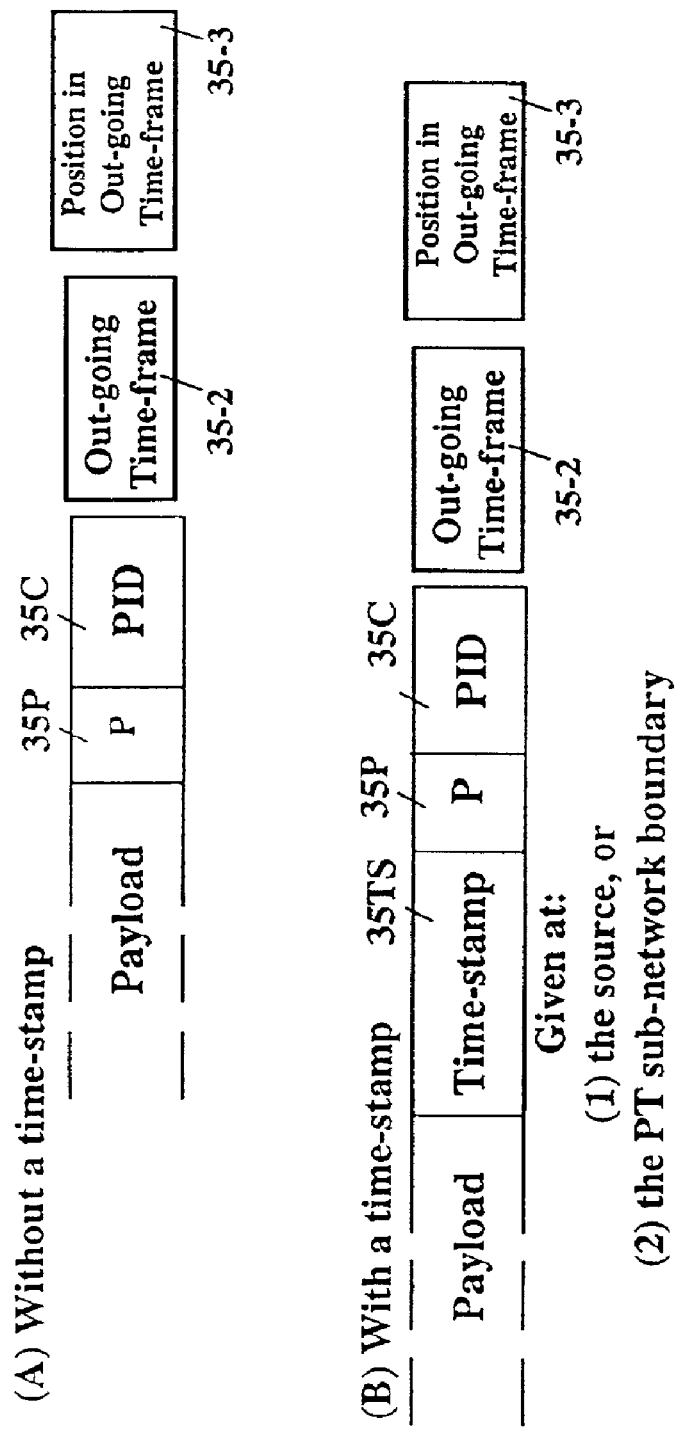
FIG. 13 is a schematic illustration of a data packet which is sent across the fabric to the output port.

Time stamp, PID (shown in the packet headers in FIG. 13) and position 35PC by (1) the time stamp 35TS in the data packet header in FIG. 13B, (2) the virtual pipe ID (PID) 35C in the data packet header in FIG. 13B (the virtual pipe is discussed in details at the end of this description), and (3) the position value 35P within that time frame as measured by the position counter 35PC. This is depicted in FIG. 15.

The data packets, see for example FIG. 13, can have various formats, such as, Internet protocol version 4 (IPv4), Internet protocol version 6 (IPv6), asynchronous transfer mode (ATM) cells. The data packets PID 35C can be determined by one of the following: an Internet protocol (IP) address, an asynchronous transfer mode (ATM), a virtual circuit identifier, and a virtual path identifier (VCI/VPI), Internet protocol version 6 (IPv6) addresses, Internet MPLS (multi protocol label swapping or tag switching) labels, and IEEE 802 MAC (media access control) address.

Figure 14:
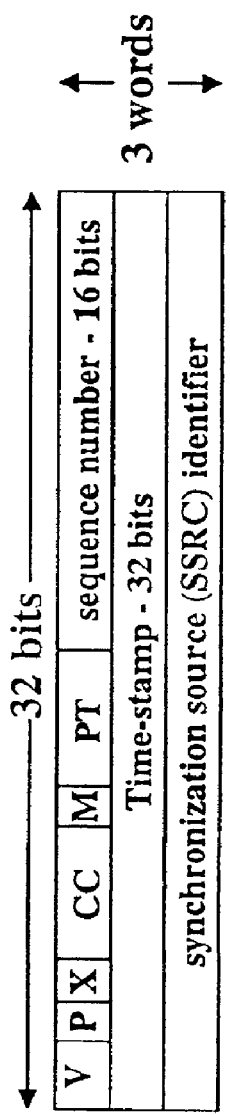
FIG. 14 is a description of the real-time protocol (RTP) data packet header with timestamp field of 32 bits.

The time stamp 35TS in the packet header in FIG. 13B can be generated by an application using Internet real-time protocol (RTP) and is used also in the ITU-T H.323 standard. Such data packets the format depicted in FIG. 14. Alternatively the time-stamp can be generated by a predefined one of the switches in the system, or alternatively the time stamp is generated at the respective end node for inclusion in the respective originated data packet.

Figure 16:
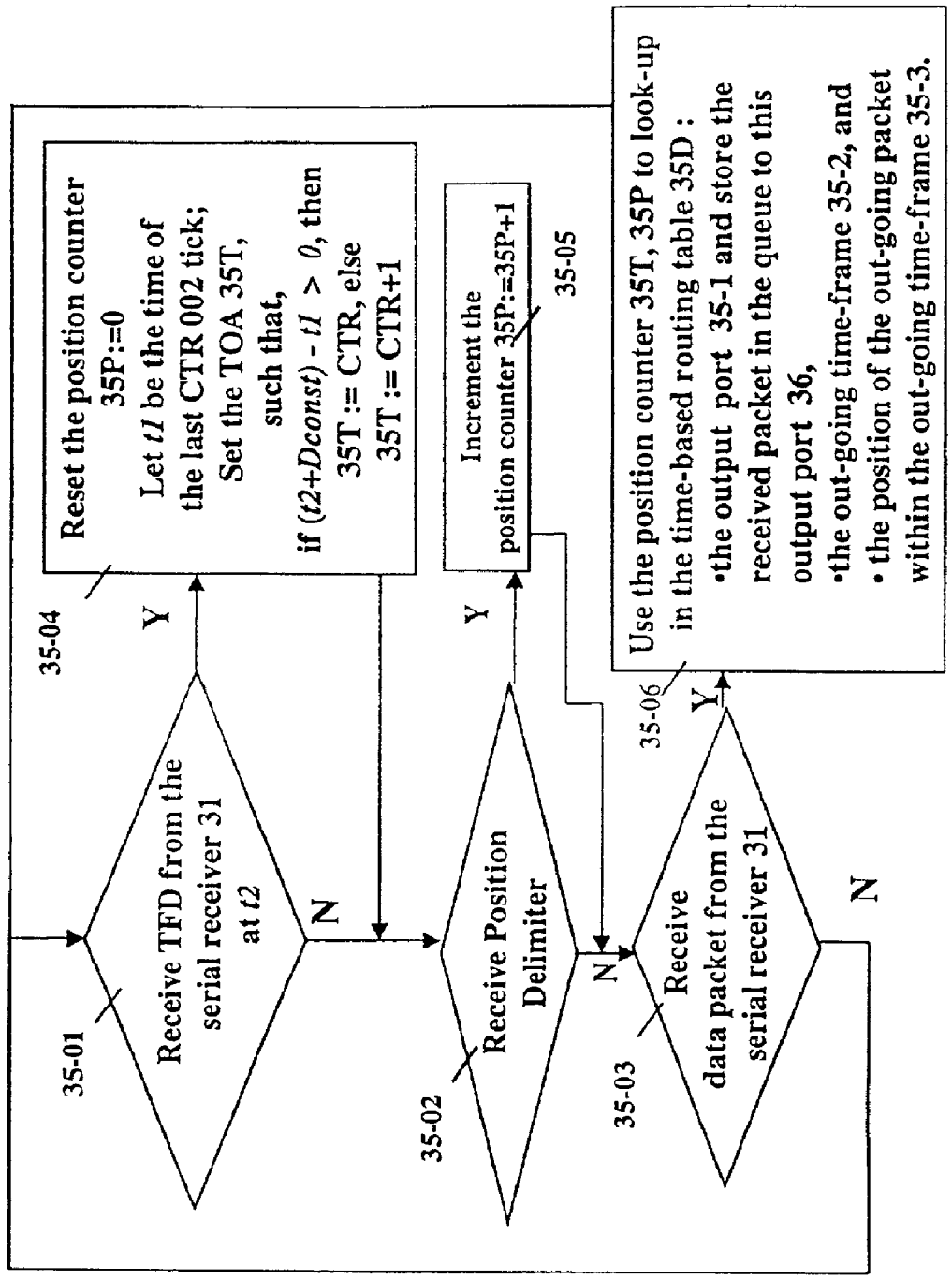
FIG. 16 is a description of the routing controller operation.

FIG. 16 is a detailed description of the program executed by the time-based routing controller 35B. The program is responsive to three events from the serial receiver 31 and the position value 35P within that time frame as measured by the position counter 35PC. The time-based routing controller program FIG. 16 using the three parameters in table 35D in FIGS. 12 and 15 that is associated with this incoming packet operates as follows:

1. Receive time frame delimiter TFD 35-01—responsive to this event the routing controller resets the position counter (35P:=0 in 35-04 of FIG. 16) and computes the time-frame of arrival (TOA) 35T value as specified in 35-04 of FIG. 16. For this computation it uses a constant, Dconst, which is the time difference between the common time reference (CTR) 002 tick and the reception of the TFD at time t2 (note that the TFD was generated on an adjacent switch by the CTR 002 on that node). This time difference is caused by the fact that the delay from the serial transmitter 49 to the serial receiver 31 is not an integer number of time frames.
2. Receive position delimiter PD 35-02—responsive to this event it increments the position counter, 35P:=35P+1, 35-05 of FIG. 16.
3. Receive data packet 35-03—responsive to this event three operations are performed as shown in 35-06 of FIG. 16: (1) the out-going time frame parameter 35-2 is attached to the packet header, (2) the position within the out-going time frame parameter 35-3 is attached to the packet header, and (3) the data packet is stored in the queue 36 using the output port parameter 35-1 in table 35D in FIGS. 12 and 15.

The Switching Fabric:

There are numerous ways to implement a switching fabric, however, since the switching fabric is not the subject of this invention it will be described only briefly. The main property that the switching fabric should ensure is that packets for which the priority bit P (35P in FIG. 13) is set to high priority (i.e., reserved traffic) will be switched into the output port in a constant bounded delay—measured in time frames.

This is possible when the packets in the input ports are already separated into queues to their respective output ports, then by using the Clos theorem in the time domain (see J. Y. Hui "Switching and Traffic Theory for Integrated Broadband Networks," page 65) the delay can be bounded by two time frames—one time frame at the input port and one time frame to get across the switching fabric. Other implementation can be based on shared bus with round robin service of the high priority data packets or on a crossbar switch.

Another possible switch design is shared memory, which ensures a deterministic delay bound from an input port to an output port. Shared memory packet switches are commercially available from various vendors, for example, MMC Networks Inc. (Santa Clara, Calif.).

Figure 17:
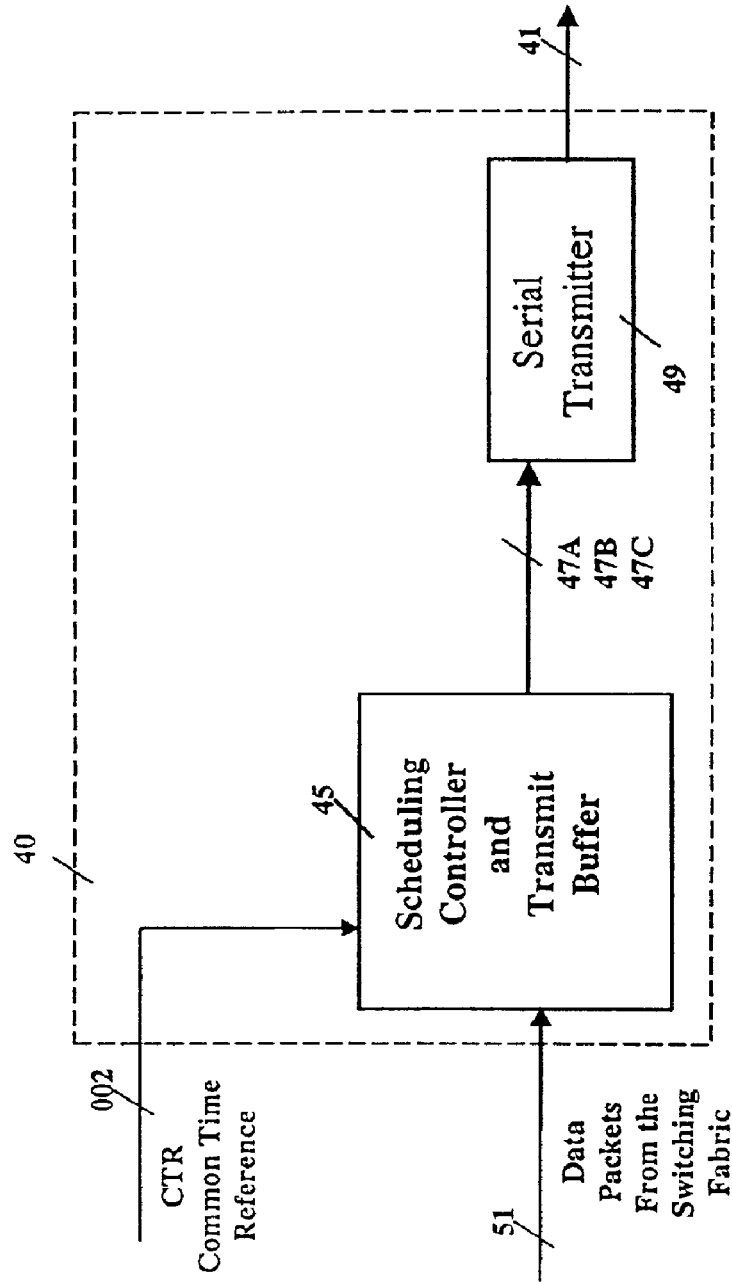
FIG. 17 is a schematic illustration of an output port with a scheduling controller and a serial transmitter.

The Output Port:

The output is depicted in FIG. 17, it has two parts a scheduling controller with a transmit buffer 45, and serial transmitter 49, which was described before. The data packet scheduling controller 45A, in FIG. 18, transfers the data packet the transmit buffer which is a random access memory (RAM) 45C, as described below.

Figure 18:
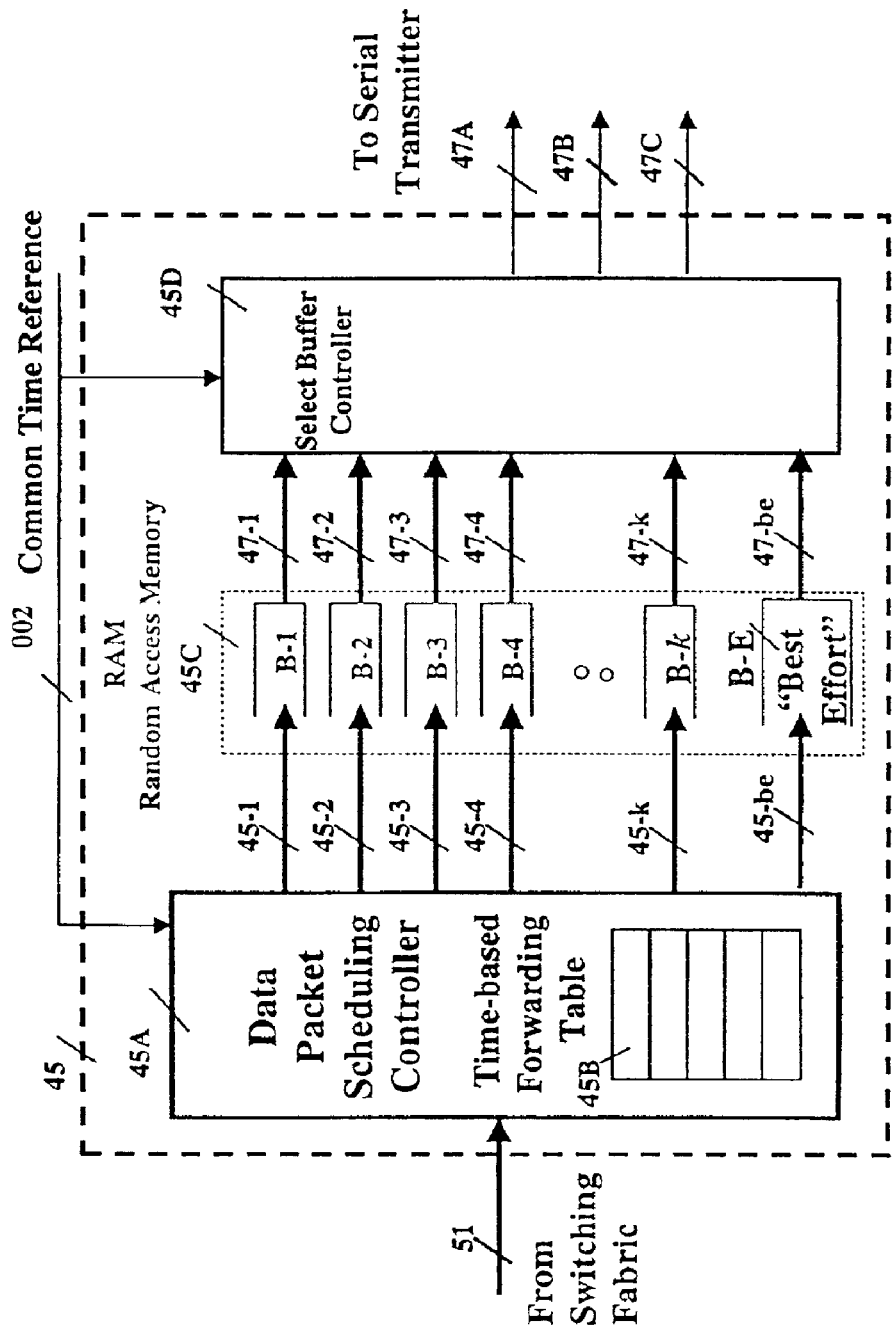
FIG. 18 is a functional description of the scheduling controller with its transmit buffer and select buffer controller.
Figure 19:
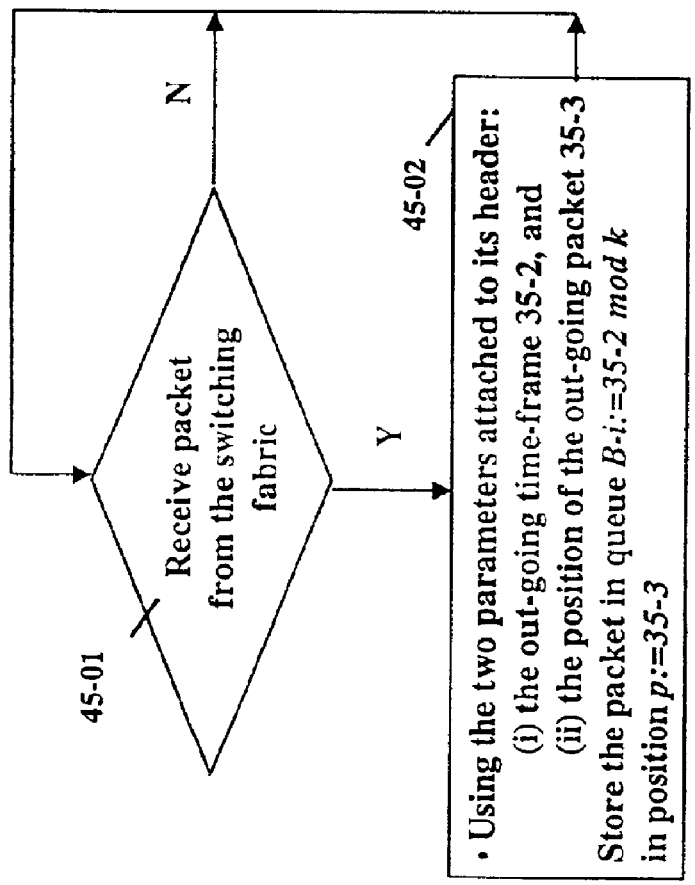
FIG. 19 is a specification of the data packet scheduling controller 45A operation.
Figure 20:
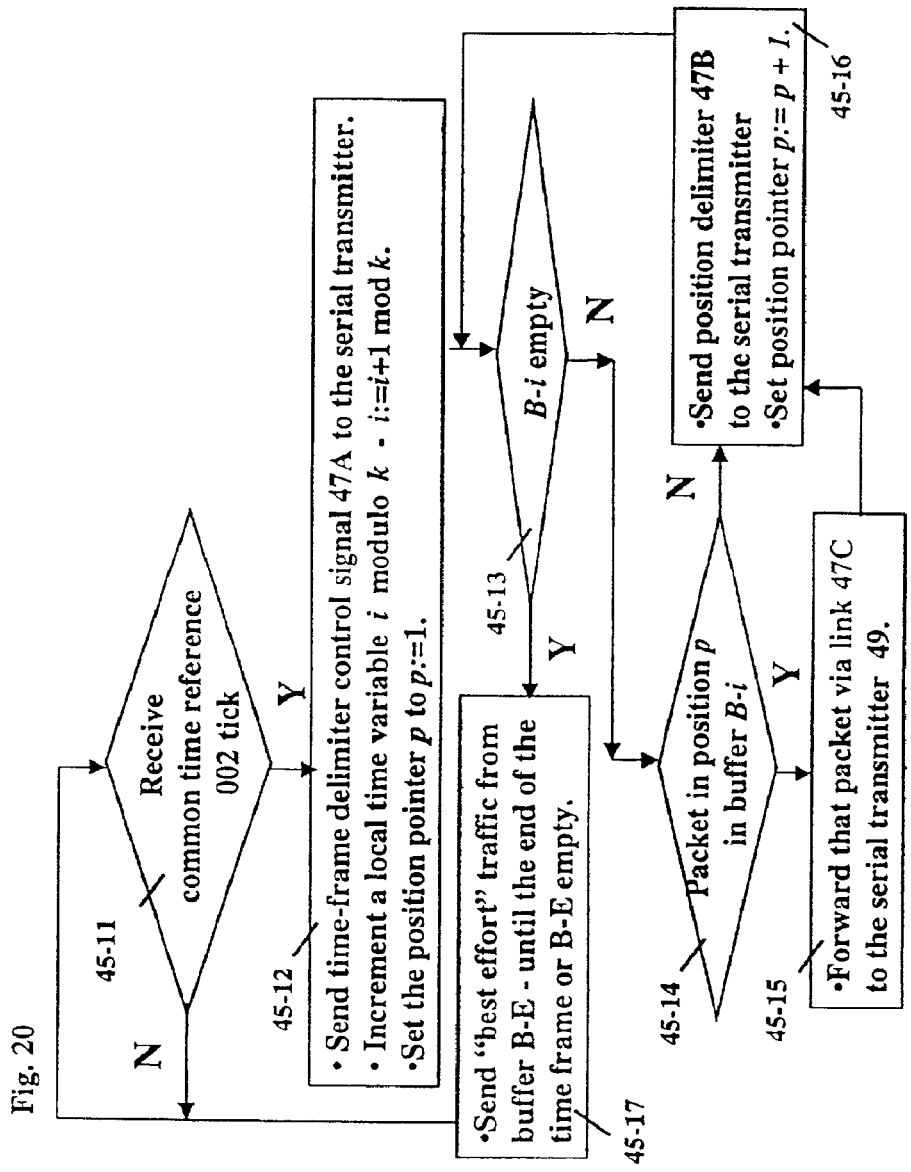
FIG. 20 is a specification of the Select Buffer Controller 45D.

The data packet scheduling controller 45 operation is described in FIGS. 18-20 which includes a transmit buffer 45C and a select buffer controller 45D. The scheduling controller 45A together with the select buffer controller 45D perform the mapping, using the two parameters, 35-2 and 35-3, that were attached to the data packet by the time-based routing controller 35B. Both controllers are constructed of a central processing unit (CPU), a random access memory (RAM) for storing the data, and read only memory (ROM) for storing the controller processing program.

Data packets that arrive from the switching fabric 50 via link 51 in which their priority bit 35P is asserted (i.e., reserved traffic) will be switched by the data packet scheduling controller 45A to one of the k transmit buffers 45C: B-1, B-2, . . . , B-k. Each of the k buffers is designated to store packet that will be forwarded in each of the k time frames in every time cycle, as shown in FIGS. 3 and 4. The actual program executed by the data packet scheduling controller is described in FIG. 19. When data packet is received from the fabric 45-01 (in FIG. 19) the two parameters, 35-2 and 35-3, in the data packet header are used to determine in which of the transmit buffer, between B-1 and B-k, to store that data packet and in what position, as specified in 45-02 in FIG. 19.

Incoming data packets in which their priority bit 35P, see FIG. 13, is not asserted (i.e., non-reserved traffic) will be switched by the data packet scheduling controller to the transmit "best effort" buffer B-E via link 45-be.

FIG. 20 depicts the select buffer controller 45D operation, which is responsive to the common time reference (CTR) tick 002, as specified in 45-11 (FIG. 20). Consequently, the select buffer controller increments the transmit buffer index i 45-12 (i.e., i:=i+1 mod k, where k is the time cycle size in time frames), sends a time frame delimiter TFD 47A to the serial transmitter 45-12, and reset the position pointer to one, p:=1 45-12. Then while the transmit buffer B-i is not empty 45-13, it will send a data packets from transmit buffer B-i, as specified in 45-14, 45-15 and 45-16, else if the transmit buffer B-i is empty, it will send "best effort" data packets from the "best effort" buffer B-be, as specified in 45-17, until the end of the time frame (the next CTR 002 tick) or until buffer B-E becomes empty.

When the transmit buffer B-i is not empty 45-13, the select buffer controller sends data packets from all of the non-empty predefined positions in that buffer, as specified in 45-14. After sending a data packet or if position p in buffer B-i is empty 45-15, the select buffer controller sends a position delimiter (PD) 47B to the serial transmitter and increments the position pointer p:=p+1, as specified in 45-16.

Virtual Pipes:

The switches 10 described in this invention can be used to construct plurality of virtual pipes 25, shown in FIG. 21 and FIG. 22, over a data network with general topology. Such data network can span the globe. Each virtual pipe 25 is constructed over one or more switches 10, shown in FIGS. 1 and 6, which are interconnected via communication links 41 in a path. FIG. 21 depicts a virtual pipe 25 from the output port 40 of switch A, through switches B and C, and this virtual pipe ends at the output port 40 of node D. The virtual pipe 25 transfers data packets from at least one source to at least one destination. FIG. 22 depicts three virtual pipes: virtual pipe 1 from the output of switch A to the output of switch D, virtual pipe 2 from the output of switch B to the output of switch D, and virtual pipe 3 from the output of switch A to the output of switch C.

The data packet transfers over the virtual pipe 25 switches 10 are designed to occur during a plurality of predefined time intervals, wherein each of the predefined time intervals is comprised of a plurality of predefined time frames. The timely transfers of data packets are achieved by coupling a common time reference 002 (CTR) signal to each of the switches 10.

Pipeline Forwarding:

Pipeline forwarding relates to data packets being forwarded across a virtual pipe 25 with a predefined delay in every stage (either across a communication link 41 or across a switch 10 from input port 30 to output port 40). Data packets enter a virtual pipe 25 from one or more sources and forwarded to one or more destinations.

Figure 23:
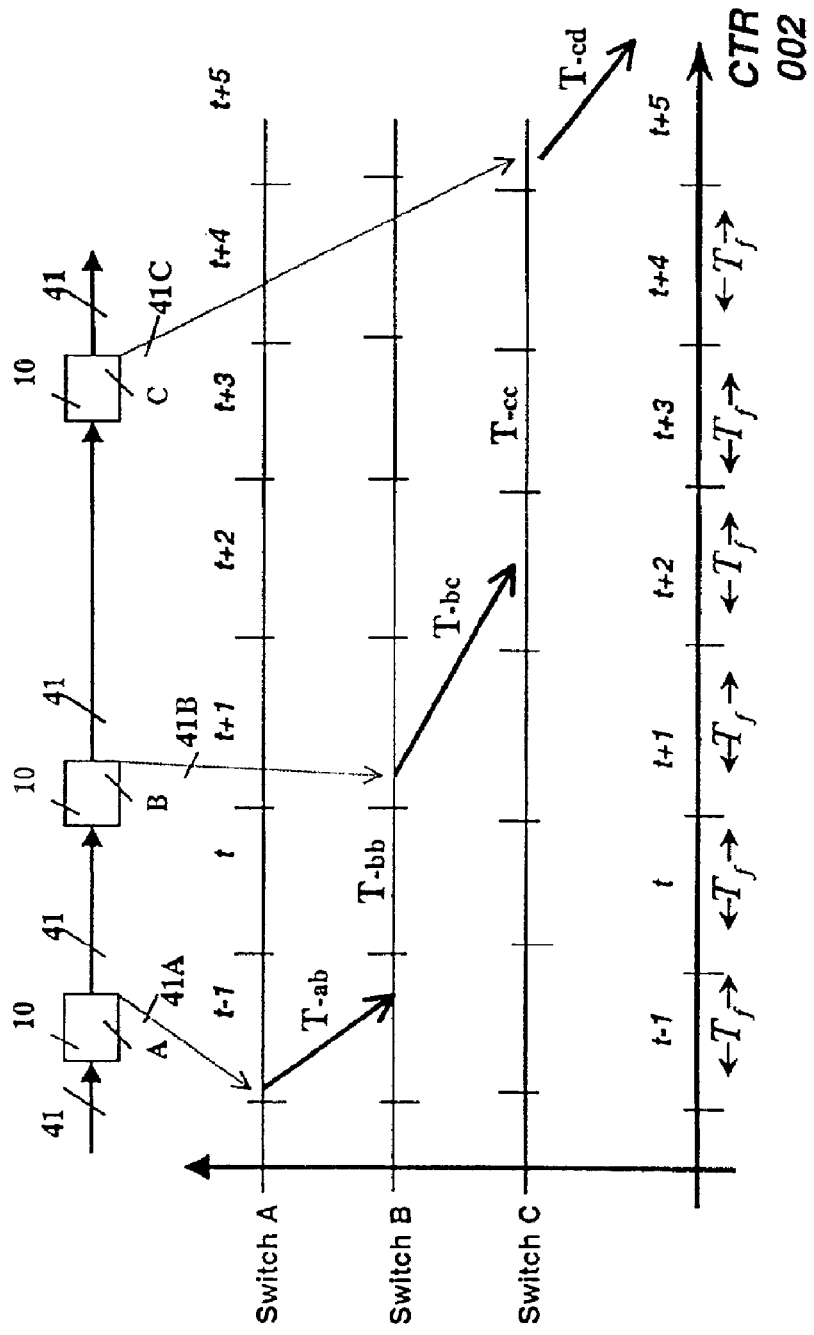
FIG. 23 is a schematic illustration of a data packet pipeline forwarding over a virtual pipe with common time reference (CTR)

This sort of pipeline forwarding used in accordance with the present invention is illustrated in FIG. 23. Data packet 41A is forwarded out of switch A during time frame t−1. This data packet 41A will reach switch B after a delay of T-ab. This data packet 41A will be forwarded out of switch B as data packet 41B during time frame t+1 and will reach switch C after a delay of T-bc. This data packet 41B will be forwarded out of switch C as data packet 41C during time frame t+5. Data packet 41C will reach switch D after a delay of T cd. Consequently, the delay from the output of switch A to the output of switch C is 6=t+5−(t−1) time frames. As illustrated in FIG. 23, all data packets that are forwarded over that virtual pipe will have a delay of six time frames from the output of switch A to the output of switch C.

Referring again to FIG. 21, the timely pipeline forwarding of data packets over the virtual pipe 25 is illustrated. A data packet is received by one of the input ports 30 of switch A at timeframe 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 21,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multicast (one-to-many) data packet forwarding).

The communication link 41 between two adjacent ones of the switches 10 can be used simultaneously by at least two of the virtual pipes.

In FIG. 22, where there are three virtual pipes:

The three virtual pipes can multiplex (i.e., mix their traffic) over the same communication links.

The three virtual pipes can multiplex (i.e., mix their traffic) during the same time frames and in an arbitrary manner.

The same time frame can be used by multiple data packets from one or more virtual pipes.

Virtual Pipe Capacity Assignment:

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super cycles.

Figure 24:
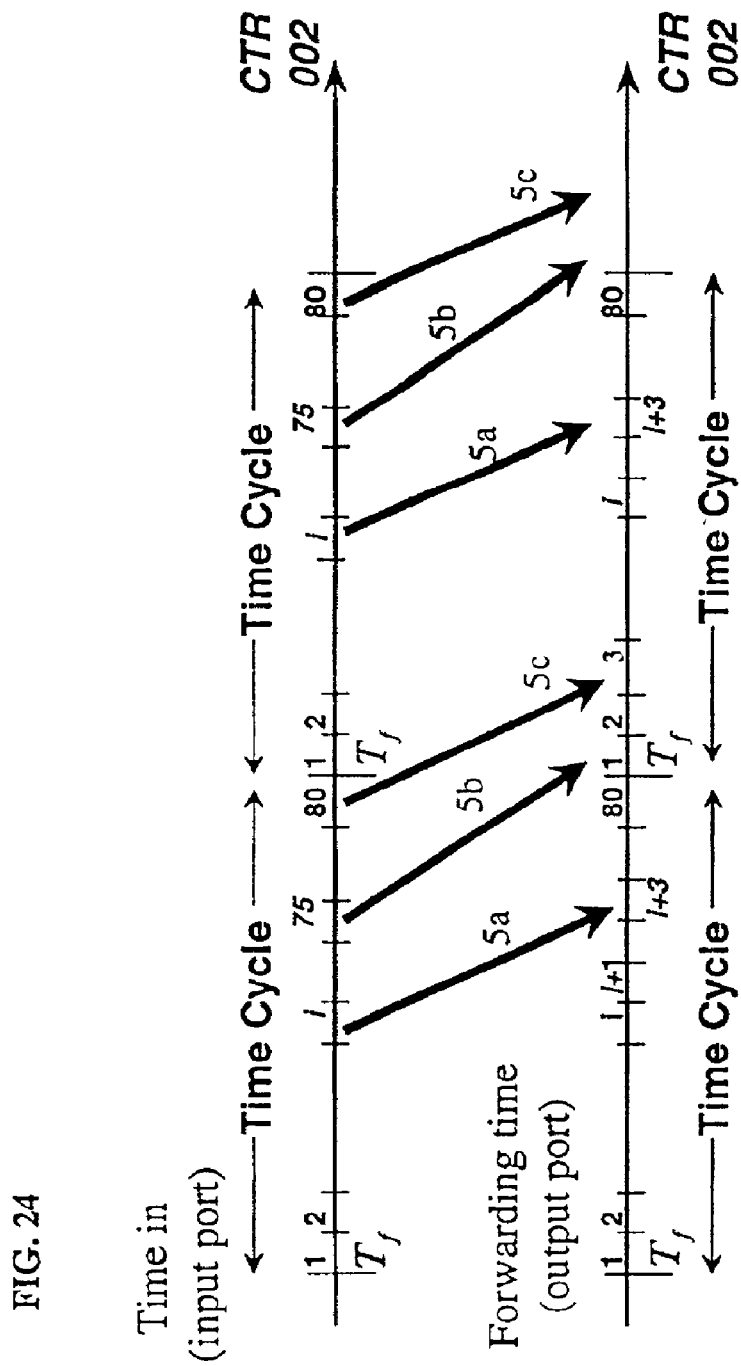
FIG. 24 is an illustrative example of the mapping of the time frames into and the time frames out of a node on a virtual pipe. The mapping repeats itself in every time cycle.

FIG. 24 illustrates the timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch. If each of the three data packets has 125 bytes or 1000 bits, and there are 80 time frames of 125 microseconds in each time cycle (i.e., time cycle duration of 10 $\mu$sec), then the bandwidth allocated to this virtual pipe is 300,000 bits per second.

In general, the bandwidth or capacity allocated for a virtual pipe is computed by dividing the number of bits transferred during each of the time cycles by the time cycle duration. In the case of a super cycle, the bandwidth allocated to a virtual pipe is computed by dividing the number of bits transferred during each of the super cycles by the super cycle duration.

The switch 10 structure, as shown in FIG. 6, can also be referred to as a pipeline switch, since it enables a network comprised of such switches to operate as a large distributed pipeline architecture, as it is commonly found inside digital systems and computer architectures.

Each pipeline switch 10 is comprised of a plurality of addressable input ports 30 and output ports 40. As illustrated in FIG. 10, the input port 30 is further comprised of a routing controller 35 for mapping each of the data packets that arrives at each one of the input ports to a respective one of the output ports. As illustrated in FIG. 17, the output port 40 is further comprised of a scheduling controller and transmit buffer 45. An output port 40 is connected to an input port 30 via a communication link 41, as shown in FIG. 7. The communication link can be realized using various technologies compatible with the present invention.

As shown in FIG. 6, the common time reference 002 is provided to the input ports 30 and output ports 40 from the GPS time receiver 20, which receives its timing signal from the GPS antenna 001. GPS time receivers are available from variety of manufacturers, such as, TrueTime, Inc. (Santa Rosa, Calif.). With such equipment it is possible to maintain a local clock with accuracy of ±1 microsecond from the UTC (Coordinated Universal Time) standard everywhere around the globe.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A system for transferring a plurality of scheduled data packets from at least one source to at least one destination, wherein the transfer of the scheduled data packets are provided during respective ones of a plurality of predefined time intervals, wherein each of the predefined time intervals is comprised of a plurality of predefined time frames, the system comprising:

a virtual pipe comprising at least two switches interconnected in a path via communication links, each of said switches having plurality of input ports and plurality of output ports;

a common timing reference signal coupled to each of the switches;

wherein for each of the input ports of each switch there is an associated a predefined position within a first predefined time frame within which a scheduled data packet is transferred into the respective input port and an associated separate predefined position within a second predefined time frame within which the respective scheduled data packet is transferred from the output port out of the respective switch.

2. The system as in claim 1, wherein for each switch, there are predefined positions within a predefined subset of the first predefined time frames during which the scheduled data packets are transferred into the input port of the switch and wherein there are additional predefined positions within an additional predetermined subset of the second predefined time frames during which the scheduled data packets are transferred from the output port out of the switch.

3. The system in claim 1, wherein the communication links are at least one of fiber optic, fiber optic with WDM (wave division multiplexing), wireless communication links.

4. The system as in claim 3, wherein the wireless communication links are at least one of ground station and satellite, and between two satellites orbiting the earth.

5. The system as in claim 1, wherein the scheduled data packets are at least one of Internet protocol (IP) data packets, fiber channel data packets, and asynchronous transfer mode (ATM) cells.

6. The system as in claim 1, wherein all the scheduled data packet forwarded over the same virtual pipe are assigned a pipe identification (PID) associated with that virtual pipe.

7. The system as in claim 6, wherein the PID is determined responsive to the time frame associated with the input to the input port, and the position within said time frame.

8. The system as in claim 6, wherein the scheduled data packet is comprised of a time stamp designating the scheduled data packet origination time, wherein the PID is determined responsive to the time stamp.

9. The system as in claim 8, wherein the time-stamp is generated in accordance with the Internet real-time protocol (RTP).

10. The system as in claim 8, wherein the time-stamp is generated by a predefined and predetermined switching node in said system.

11. The system as in claim 1, wherein when there are no scheduled data packet to be transmitted in a time frame, "best effort" data packets are transmitted.

12. The system as in claim 11, further comprising:

a scheduling controller; and a select buffer controller;

wherein the data packets are scheduled for transmission by the scheduling controller, and responsive to the select buffer controller determining that there are no scheduled data packets to be transmitted in a given time frame, the scheduling controller forwards "best effort" data packets to the serial transmitter.

13. The system as in claim 1, wherein the virtual pipe has a start and an end, and wherein mapping of the scheduled data packets into the start and out from the end is scheduled to occur within a predefined number of time frames.

14. A system for switching data packets from at least one source to at least one destination, wherein the transfer of the data packets is provided during respective ones of a plurality of predefined time frames with predefined time intervals, wherein each of the predefined time intervals is comprised of a plurality of the predefined time frames, and within a predefined position within the time frame, said system comprising:

a plurality of switches with plurality of uniquely addressable input and output ports; wherein the switches are interconnected via communication links;

a common time reference signal coupled to each of the switches;

wherein the common time reference is partitioned into respective ones of the time frames;

wherein a predefined number of contiguous ones of the time frames are grouped into a time cycle; and wherein a predefined number of contiguous time cycles are grouped into a super cycle;

a time-based routing controller at the input port for determining uniquely to which of the output ports a data packet should be switched responsive to the time-frame of arrival (TOA) of said data packet at the input port, and position of said data packet within said time-frame of arrival (TOA);

a scheduling controller and transmit buffer for forwarding data packets out of the respective output port at a predefined scheduled time frame and position within said time frame.

15. The system as in claim 14, wherein the common time reference reflects the UTC time and is represented as a time frame number within a time cycle, and as a time cycle number within the super cycle.

16. The system as in claim 14, wherein a position delimiter signal is output between every two successive time frames responsive to the common time reference;

wherein the time-based routing controller is further comprised of:
a time-based controller;
a position counter for counting the position delimiter signals in the time frames associated with incoming packets, and for providing an instant position counter value;
a time-based routing table that determines (i) the output ports said respective data packet will be switched to, (ii) a time frame associated with output of the respective data packet, and (iii) position within a time frame for the respective data packet to be output from the output port, responsive to (i) the time-frame of arrival (TOA) and (ii) the instant position counter value.

17. The system as in claim 16, wherein the data packets are comprised of a packet header having a time stamp;
wherein the time of arrival is determined responsive to the time stamp and the common time reference.

18. The system as in claim 16, wherein the data packets are comprised of a packet header, and wherein the time frame associated with output and the position within the time frame for the respective output port are attached to become a part of the packet header.

19. The system as in claim 18,
wherein the system is further comprised of:
a scheduling controller;
wherein the scheduling controller is responsive to the time-frame of arrival (TOA) and within said time frame of arrival to provide an associated out-going time frame and the position in said out-going time frame for output from the output port.

20. The system as in claim 19, wherein the scheduling controller stores data packets in a random access memory buffer responsive to the out-going time frame and the position within said out-going time frame.

21. The system as in claim 1,
wherein all scheduled data packets that are transferred into the respective input port during the first predefined time frame are transferred out from the same output port out of the respective switch during the second predefined time frame.

22. The system as in claim 21,
wherein the scheduled data packets are data units without headers.

23. The system as in claim 22,
wherein the data unit is at least one of a SONET STS-1 frame, a SONET STS-N frame, a fraction of SONET STS-1 frame, a plurality of SONET STS-1 frames, a plurality of asynchronous transfer mode (ATM) cells.

24. A method for transferring a plurality of scheduled data packets from at least one source to at least one destination, wherein the transfer of the scheduled data packets are provided during respective ones of a plurality of predefined time intervals, wherein each of the predefined time intervals is comprised of a plurality of predefined time frames, the method comprising:

interconnecting as a virtual pipe comprising at least two switches in a path via communication links, each of said switches having plurality of input ports and plurality of output ports;

coupling a common timing reference signal to each of the switches;

associating a predefined position within a first predefined time frame within which a scheduled data packet is transferred into the respective input port and an associated separate predefined position within a second predefined time frame within which the respective scheduled data packet is transferred from the output port out of the respective switch, for each of the input ports of each switch.

25. The method as in claim 24, further comprising:
providing predefined positions within a predefined subset of the first predefined time frames during which the scheduled data packets are transferred into the input port of the switch, for each switch, and providing additional predefined positions within an additional predetermined subset of the second predefined time frames during which the scheduled data packets are transferred from the output port out of the switch, for each switch.

26. The method as in claim 24, further comprising:
forwarding all the scheduled data packets over the same virtual pipe with an assigned pipe identification (PID) associated with that virtual pipe.

27. The method as in claim 26, further comprising:
determining the PID responsive to the time frame associated with the input to the input port, and the position within said time frame.

28. The method as in claim 26, wherein the scheduled data packet is comprised of a time stamp designating the scheduled data packet origination time, the method further comprising:
determining the PID responsive to the time stamp.

29. The method as in claim 24, further comprising:
transmitting "best effort" data packets when there are no scheduled data packets to be transmitted in a time frame.

30. The method as in claim 29, further comprising:

"best effort" scheduling data packets for transmission responsive to determining that there are no scheduled data packets to be transmitted in a given time frame.

31. The method as in claim 24, wherein the virtual pipe has a start and an end, the method further comprising:

mapping of the scheduled data packets into the start and out from the end, scheduled to occur within a predefined number of time frames.

32. The method as in claim 24, further comprising:

transferring selected scheduled data packets into the respective input port during the first predefined time frame, and transferring the selected scheduled data packets out from the same output port out of the respective switch during the second predefined time frame.

33. The method as in claim 32, wherein the scheduled data packets are data units without headers.

34. The method as in claim 33, wherein each of the data units is at least one of a SONET STS-1 frame, a SONET STS-N frame, a fraction of SONET STS-1 frame, a plurality of SONET STS-1 frames, a plurality of asynchronous transfer mode (ATM) cells.

* * * * *